(12) United States Patent
Glover

(10) Patent No.: US 10,120,951 B2
(45) Date of Patent: Nov. 6, 2018

(54) BIFURCATED SEARCH

(71) Applicant: Samsung Electronics Co., Ltd., Suwon-si, Gyeonggi-do (KR)

(72) Inventor: Eric J. Glover, Palo Alto, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 541 days.

(21) Appl. No.: 14/824,862

(22) Filed: Aug. 12, 2015

(65) Prior Publication Data
US 2017/0046436 A1  Feb. 16, 2017

(51) Int. Cl.
*G06F 7/00* (2006.01)
*G06F 17/30* (2006.01)

(52) U.S. Cl.
CPC .. G06F 17/30887 (2013.01); G06F 17/30592 (2013.01)

(58) Field of Classification Search
CPC .............................................. G06F 17/30864
See application file for complete search history.

(56) References Cited

U.S. PATENT DOCUMENTS

2004/0215607 A1* 10/2004 Travis, Jr. ......... G06F 17/30864
2013/0275164 A1* 10/2013 Gruber .................... G10L 17/22
705/5

* cited by examiner

Primary Examiner — Ajith Jacob
(74) Attorney, Agent, or Firm — Jefferson IP Law, LLP

(57) ABSTRACT

A method includes receiving a first search query from a user device and transmitting the first search query from data processing hardware to a query analysis system and a first search system. The method includes receiving first search results from the first search system and receiving query information from the query analysis system. The method includes transmitting a second search query from the data processing hardware to the application program interface of the second search system. The second search query based on the query information. The method includes receiving second search results from the second search system and determining a result set that includes at least some of the first search results and the second search results. At least one search result includes an application access mechanism having a reference to a corresponding installed application on the user device.

41 Claims, 23 Drawing Sheets

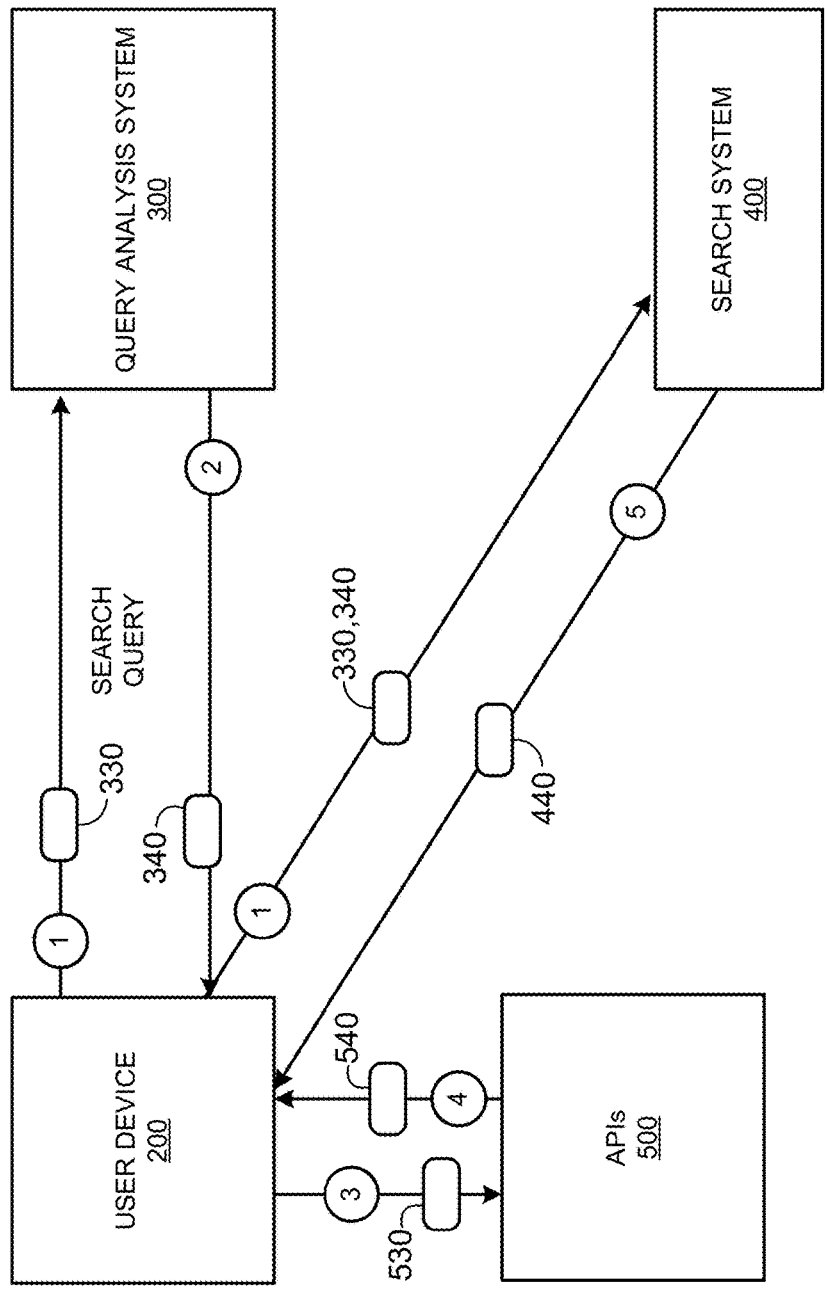

BIFURCATED SEARCH

TECHNICAL FIELD

This disclosure relates to accessing search results from multiple sources through multiple mechanisms.

BACKGROUND

In recent years, use of computers, smartphones, and other Internet-connected devices has grown exponentially. Correspondingly, the number of available software applications for such devices has also grown. Today, many diverse native and web software applications can be accessed on any number of different devices, including, but not limited to, smartphones, personal computers, automobiles, and televisions. These diverse applications can range from business driven applications, games, educational applications, news applications, shopping applications, messaging applications, media streaming applications, social networking applications, and so much more. Furthermore, application developers develop vast amounts of applications within each genre and each application may have numerous editions.

Currently, when a search is executed on a computer, smartphone, or other Internet-connected device, the search is mostly implemented on a search server. The computer, smartphone, or other Internet-connected device does not execute the search, but instead sends the search request to the search server, which executes a search and sends the results to the originating device. This structure is becoming obsolete due to some data not being available to the search server. Some data may only be available through an application associated with an application programming interface (API), where a user device may only access the information by way of the API, since the application may require a subscription.

SUMMARY

The present disclosure provides systems and techniques for accessing multiple sources of search results (e.g., different search systems) via different mechanisms and providing a result set that includes search results from the multiple sources of search results (e.g., the different search systems). In some implementations, a method includes generating search queries for different search systems based on information that may include a search query (e.g., a search string), API information, user information or other information, and querying the different search systems using the respective search queries. The method may also include generating a results set that includes at some of the search results retrieved from the different search systems via the queries.

One aspect of the disclosure provides a method that determines a result set based on a search query. The method includes receiving, at data processing hardware, a first search query through a user device in communication with the data processing hardware. The method also includes transmitting the first search query from the data processing hardware to a query analysis system and a first search system. The method also includes receiving, at the data processing hardware, first search results from the first search system and query information from the query analysis system. The query information includes application programming interface information for an application programming interface of a second search system. The method also includes transmitting a second search query from the data processing hardware to the application program interface of the second search system. The second search query is based on the query information. Additionally, the method includes receiving, at the data processing hardware, second search results from the second search system and determining, by the data processing hardware, a result set that includes at least some of the first search results and the second search results. At least one search result includes an application access mechanism that has a reference to a corresponding installed application on the user device and indicates a performable operation for the corresponding installed application. The method also includes displaying, by the data processing hardware, the results set in the user interface on the screen.

Implementations of the disclosure may include one or more of the following optional features. In some implementations, the method also includes identifying, by the data processing hardware, the second search system among a collection of search systems based on the query information and/or the first search query. Additionally, the method may include determining, by the data processing hardware, the second search query for the second search system based on the query information and the first search query.

In some examples, the method includes displaying each search result of the results set in the user interface as a user selectable link. Each search result has an associated application access mechanism associated with the corresponding user selectable link. The method may also include receiving, at the data processing hardware, a user selection of one of the user selectable links, and executing, at the data processing hardware, the application access mechanism associated with the selected user selectable link. The executed application access mechanism may be associated with the selected user selectable link and may launch the corresponding installed application on the user device and set the installed application to an application state specified by the application access mechanism.

The query information may include search result display data. In some implementations, the method also includes generating, by the data processing hardware, a result score for each of the first search results and/or each of the second search results using the search result display data. The method may further include ranking, by the data processing hardware, the first search results and/or the second search results based on the corresponding result scores. In some examples, the method also includes displaying the search results of the result set in the user interface in an order based on the corresponding result scores.

Another aspect of the disclosure provides a system for determining a result set based on a search query. The system includes data processing hardware, a screen in communication with the data processing hardware, and memory hardware in communication with the data processing hardware. The memory hardware stores instructions that when executed on the data processing hardware cause the data processing hardware to perform operations. The operations include receiving a first search query through a user device in communication with the data processing hardware. The operations also include transmitting the first search query from the data processing hardware to a query analysis system and a first search system. The operations include receiving first search results from the first search system and receiving query information from the query analysis system. The query information includes application programming interface information for an application programming interface of a second search system. The operations also include transmitting a second search query from the data processing hardware to the application program interface of the second search system. The second search query is based on the query information. The operations also include receiving second search results from the second search system and determining a result set. The result set includes at least some of the first search results and the second search results. At least one search result includes an application access mechanism that has a reference to a corresponding installed application on the user device and indicates a performable operation for the corresponding installed application. The operations also include displaying the results set in the user interface on the screen.

In some implementations, the operations further include identifying the second search system among a collection of search systems based on the query information and/or the first search query. The operations further include determining the second search query for the second search system based on the query information and the first search query.

In some examples, the operations further include displaying each search result of the results set in the user interface as a user selectable link. Each search result has an associated application access mechanism associated with the corresponding user selectable link. The operations may further include receiving a user selection of one of the user selectable links and executing the application access mechanism associated with the selected user selectable link. The executed application access mechanism associated with the selected user selectable link launches the corresponding installed application on the user device and sets the installed application to an application state specified by the application access mechanism.

The query information may include search result display data. In some examples, the operations further include generating a result score for each of the first search results and/or each of the second search results using the search result display data. The operations further include ranking the first search results and/or the second search results based on the corresponding result scores. In some examples, the operations further include displaying the search results of the result set in the user interface in an order based on the corresponding result scores.

Yet another aspect of the disclosure provides another method for generating a result set based on a search query. The method includes receiving, at data processing hardware, a first search query from a user device in communication with the data processing hardware. The method also includes transmitting the first search query from the data processing hardware to a query analysis system and a first search system. The method includes receiving, at the data processing hardware, first search results from the first search system and query information based on the first search query from the query analysis system. The query information includes application programming interface information for an application programming interface of a second search system. The method includes transmitting a second search query from the data processing hardware to the application program interface of the second search system. The second search query is based on the query information. The method includes receiving, at the data processing hardware, second search results from the second search system and sending a result set from the data processing hardware to the user device. The result set includes at least some of the first search results and the second search results for display on the user device. The at least one search result includes an application access mechanism that has a reference to a corresponding installed application on the user device and indicates a performable operation for the corresponding installed application.

In some implementations, the method also includes identifying, by the data processing hardware, the second search system among a collection of search systems based on the query information and/or the first search query. The method may include determining, by the data processing hardware, the second search query for the second search system based on the query information and the first search query. The application access mechanism may be configured to launch the corresponding installed application on the user device and set the installed application to an application state specified by the application access mechanism.

The query information may include search result display data. The method may also include generating, by the data processing hardware, a result score for each of the first search results and/or each of the second search results using the search result display data. Additionally, the method may include ranking, by the data processing hardware, the first search results and/or each of the second search results based on the corresponding result scores.

Another aspect of the disclosure provides a method for generating a result set based on a search query. The method includes receiving, at data processing hardware, a first search query through a user interface displayed on a screen of a user device. The method includes transmitting the first search query from the data processing hardware to a query analysis system and a first search system. The method further includes receiving, at the data processing hardware, query information from the query analysis system. The query information includes application programming interface information for an application programming interface of a second search system. The method includes transmitting a second search query from the data processing hardware to the application program interface of the second search system, where the second search query is based on the query information. The method additionally includes receiving, at the data processing hardware, first search results from the first search system and second search results from the second search system, and determining, by the data processing hardware, a result set that include at least some of the first search results and the second search results. At least one search result includes an application access mechanism that has a reference to a corresponding installed application on the user device and indicates a performable operation for the corresponding installed application. The method also includes displaying, by the data processing hardware, the results set in the user interface on the screen.

In some examples, the query information includes at least one of: application programming interface selection data that includes one or more query parses associated with the first search query; application programming interface querying data that includes one or more application programming interface requests or instructions for generating the application programming interface; or search result display data. Each query parse includes a text string, a domain associates with the text string, or a probability value associated with the domain. In some examples, each application programming interface request is associated with a version of the first search query corrected for spelling, modified based on entity and/or location matches, and/or parameterized for an application programming interface. The data processing hardware may be local to the user device.

In some examples, the method further includes identifying, by the data processing hardware, the second search system among a collection of search systems based on the query information and/or the first search query. The method may include determining, by the data processing hardware, the second search query for the second search system based on the query information and the first search query.

The method may further include displaying each search result of the results set in the user interface as a user selectable link, where each search result has an associated application access mechanism associated with the corresponding user selectable link. The method may further include receiving, at the data processing hardware, a user selection of one of the user selectable links, and executing hardware, the application access mechanism associated with the selected user selectable link. The executed application access mechanism associated with the selected user selectable link launches the corresponding installed application on the user device and sets the installed application to an application state specified by the application access mechanism.

In some examples, the query information includes search result display data. The method may include generating, by the data processing hardware, a result score for each of the first search results and/or each of the second search results using the search result display data. The method may further include ranking, by the data processing hardware, the first search results and/or the second search results based on the corresponding result scores.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2A-2D are schematic views of an example user device in communication with a query analysis system, a search system, and API system.

Like reference symbols in the various drawings indicate like elements.

DETAILED DESCRIPTION

A system of the present disclosure may implement a search based on a query received from a user device. The user device receives a query inputted via a graphical user interface (GUI) of the user device and, in turn, the user device sends the query to a query analysis system. The query analysis system analyses the search query to determine a likely intent of the user requesting the search. The query analysis system may have greater processing and storage resources than the user device, which may allow the query analysis system to better analyze the received search query. The query analysis system facilitates searching within the user device for any application program interface (API) using the query by supplementing the search query with additional information. In addition, the query analysis module allows the user device to execute searches within applications installed on the user device. For example, the query analysis system may modify and/or parameterize the received query. Moreover, once the query analysis system analyses the received query, the system of the present disclosure can perform separate searches, one at the user device (e.g., via APIs) and the second at a search system. Once searching of the user device and the search system is complete, the user device displays, via a GUI, search results that may include results from the search of the user device and/or results received by the search system.

Figure 1A:
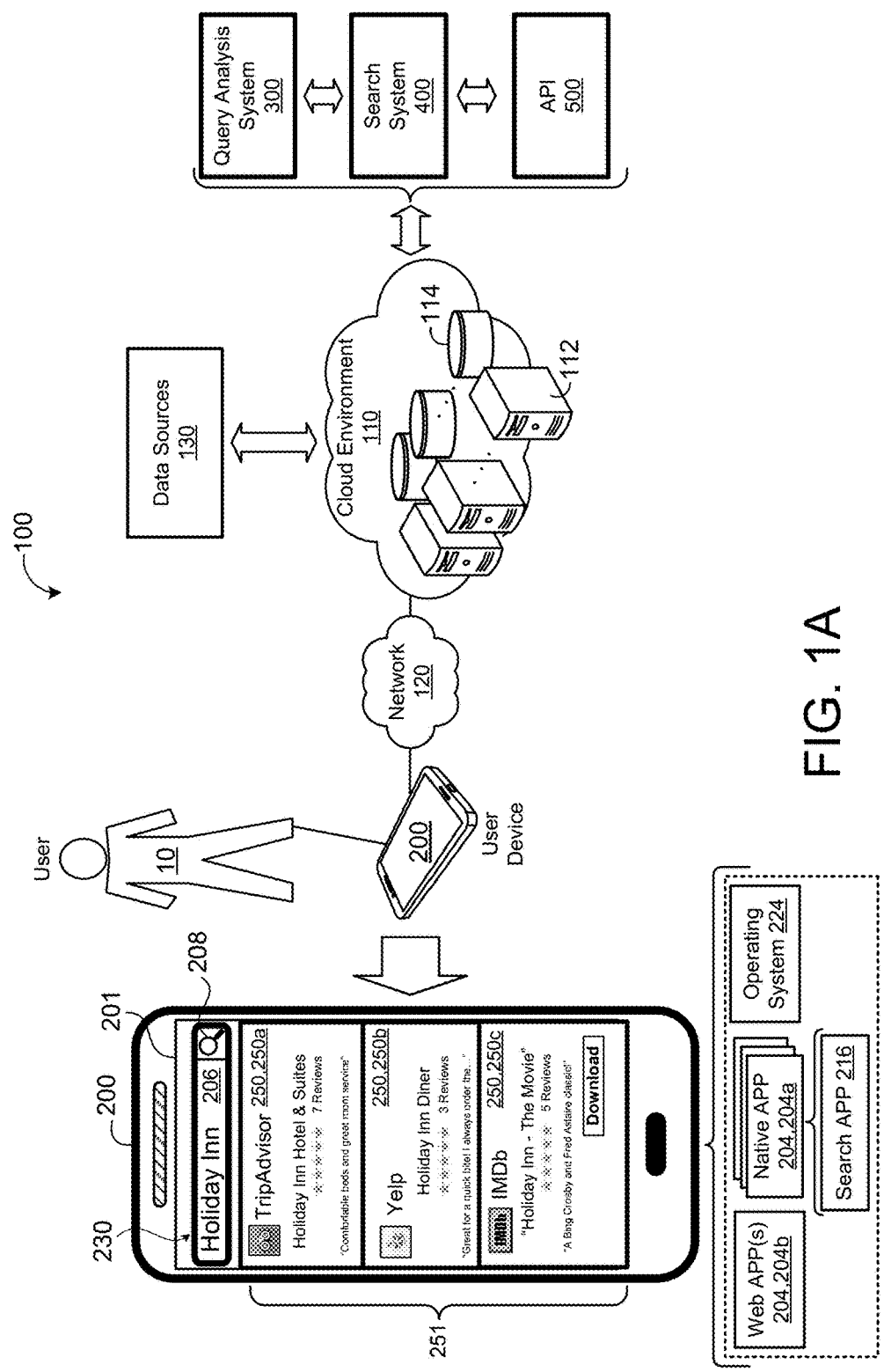
FIG. 1A is a schematic view of an example environment including a user device in communication with a query analysis system, a search system, and API system.
Figure 2A:
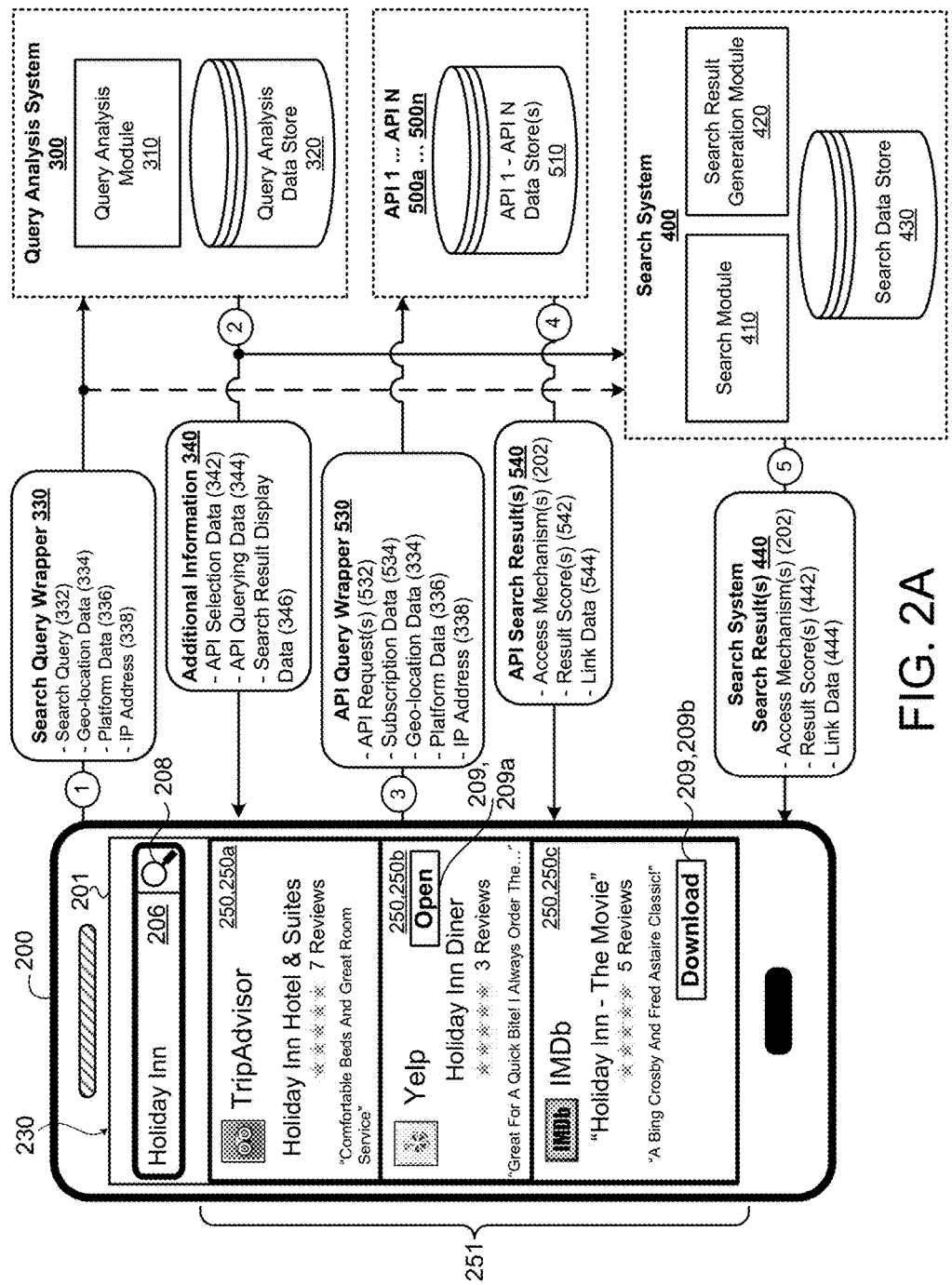

Referring to FIG. 1A, in some implementations, a user device 200 receives a search query 332 from a user 10. The user device 200 may find it difficult to execute the search at the user device 200, since the user device 200 has limited storage 260; therefore, the user device 200 cannot store and maintain all possible search results. In addition, if the user device 200 sends the search query 332 to a search server 400 that has more storage space and processing capabilities than the user device 200, the user device 200 may fail to receive search results relating to applications 204 installed on the user device 200. Thus to improve the user's ability to efficiently find good and relevant search results, the search process may be improved by implementing a system 100 that leverages a search system 400 with a query analysis system 300. The system 100 implements a bifurcated search where two searches are executed in parallel: a first search executed by the user device 200 and a second search executed by the search system 400. The search executed at the user device 200 triggers a search of one or more APIs 500. The query analysis module 300 receives the search query 332 and informs the user device 200 (by sending additional information 340) to execute a user device search. The search system 400 receives the search query 332 (from the user device 200 and/or the query analysis system 300) and executes a search system search. The user device search outputs API search results 540 (FIG. 2A), while the search system 400 search outputs search system search results 440 (FIG. 2A). The user device 200 receives both search results 440, 540 and displays the combined search results 440, 540 via a GUI 230. Therefore, it is desirable to implement a system that executes a bifurcated search that efficiently searches both a search system 400 and a user device 200, then the system 100 combines the results of each of the executed searches.

Figure 1B:
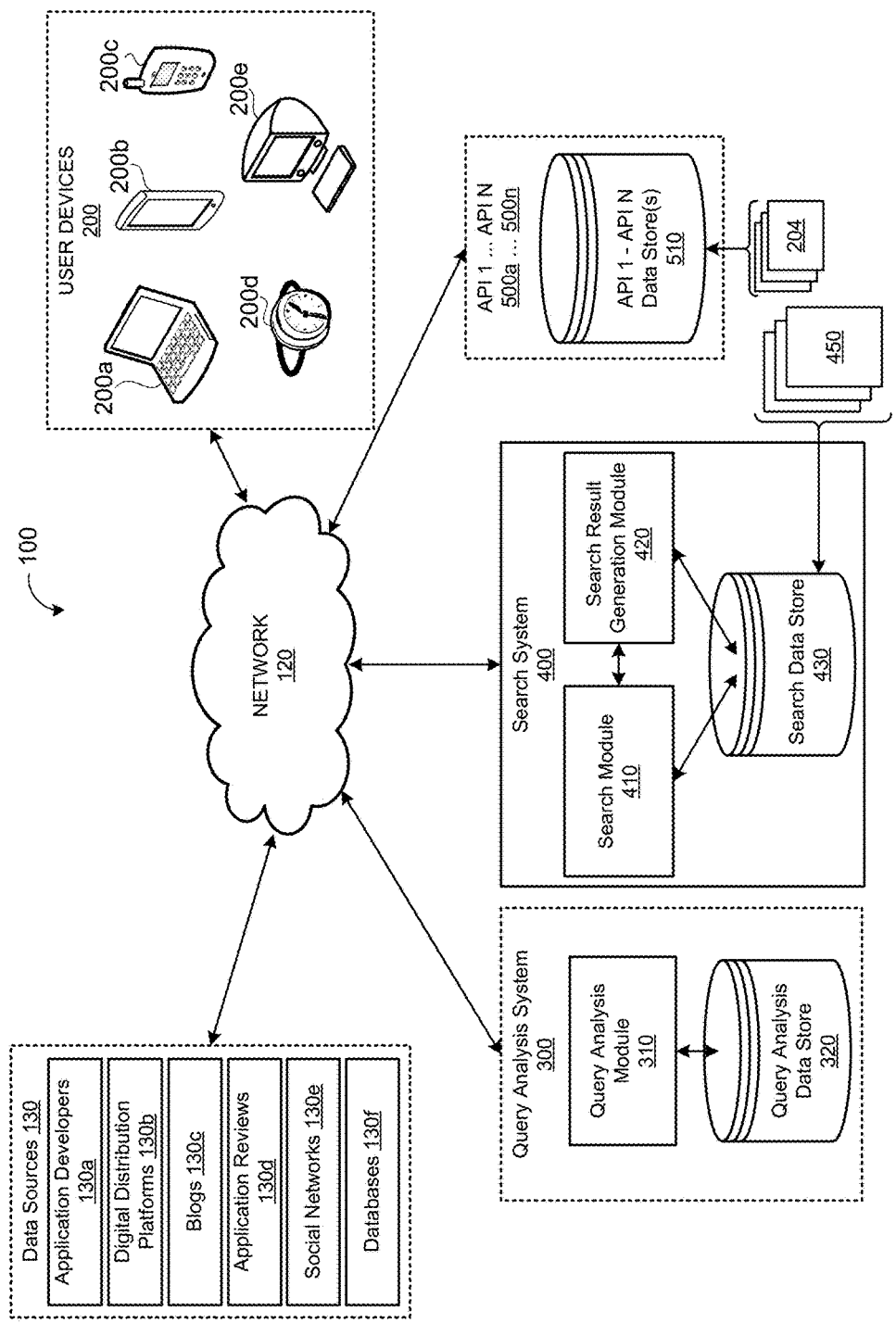
FIG. 1B is a functional block diagram of a system having a query analysis system, a search system, and API system interacting with user devices and data sources.

FIG. 1A illustrates an example system 100 that includes a user device 200 associated with a user 10 in communication with a remote system 110 via a network 120. FIG. 1B provides a functional block diagram of the system 100. The remote system 110 may be a distributed system (e.g., cloud environment) having scalable/elastic computing resources 112 and/or storage resources 114. The user device 200 and/or the remote system 110 may implement one or more query analysis systems 300 and one or more search systems 400, where each system 300, 400 optionally receives data from one or more data sources 130. In some implementations, the query analysis system 300 communicates with the search system 400, the one or more user devices 200, and the data sources(s) via a network 120. The network 120 may include various types of networks, such as a local area network (LAN), wide area network (WAN), and/or the Internet. As shown and as will be discussed, the query analysis system 300 and the search system 400 are separate modules 400. However, in other implementations, the query analysis system 300 and the search system 400 are one system executing separate functions (as will be described below). In some examples, the query analysis system 300 is physically located about or near the search system 400, so that a communication time between the two is kept to a minimum. The query analysis system 300 may be part of the search system 400, and in other examples, the search system 400 is part of the query analysis system 300.

The system 100 may include data sources 130, one or more user devices 200, the query analysis system 300, the search system 400, and one or more APIs 500 (e.g., servers and/or data stores associated with one or more applications installed on the user devices 200) communicating with one another via the network 120. The query analysis module 300 includes a query analysis module 310 in communication with a query analysis data store 320. The query analysis module 310 generates additional information 340 (FIG. 2A) associated with a search query 332 received from a user device 200. The query analysis module 310 sends the additional information 340 to the user device 200. The user device 200 uses the additional information 340 and the search query 332 to generate API search results 540. The user device 200 generates the API search results 540 by querying APIs 500 associated with applications 204 that are installed on the user device 200, i.e., applications 204 that are stored on the user device 200. The API search results 540 may correspond to application states of applications 204 associated with the APIs 500. Each API 500 accesses a function or information within an application 204, operating system 224, or search application 216. The system 100 also includes the search system 400, which includes a search module 410, a search result generation module 420, and a search data store 430. The search data store 430 stores application state records 450. The search system 400 receives the search query 332 and the additional information 340 (from the user device 200 and/or the query analysis system 300), and generates search system results 440. The search system results 440 are based on the received search query 332 (and/or a query wrapper), the additional information 340, and application state records 450 stored in the search data store 430. As will be explained below, each application state record 450 includes data relating to a function of an application 204 and/or application state of the application 204 resulting from performance of a function associated with the application state. The search system 400 may generate the application state records 450 using the data sources 130 and store the records in the search data store 430. Example application state records 450 are described with reference to FIGS. 4A and 4B. In addition, the system 100 includes one or more APIs 500 stored in one or more API data stores 510.

The data sources 130, 130a-f may be sources of data which the search system 400 (e.g., the search module 410) may use to generate and update the data store 320. In addition, the query analysis system 300 (e.g., the query analysis module) also uses the data sources 130 to update the query analysis data store 320. The data retrieved from the data sources 130 can include any type of data related to application functionality and/or application states. Data retrieved from the data sources 130 may be used to create and/or update one or more databases, indices, tables (e.g., an access table), files, or other data structures included in the data store 320. For example, application state records 450 may be created and updated based on data retrieved from the data sources 130. In some examples, some data included in a data source 130 is manually generated by a human operator. Data included in the application state records 450 may be updated over time so that the search system 400 provides up-to-date results.

The data sources 130 may include a variety of different data providers. The data sources 130 may include data from application developers 130a, such as application developers' websites and data feeds provided by developers. The data sources 130 may include operators of digital distribution platforms 130b configured to distribute native applications 204a to user devices 200. Example digital distribution platforms 130b include, but are not limited to, the GOOGLE PLAY® digital distribution platform by Google, Inc., the APP STORE® digital distribution platform by Apple, Inc., and WINDOWS PHONE® Store developed by Microsoft Corporation.

The data sources 130 may also include other websites, such as websites that include web logs 130c (i.e., blogs), application review websites 130d, or other websites including data related to applications 204. Additionally, the data sources 130 may include social networking sites 130e, such as "FACEBOOK®" by Facebook, Inc. (e.g., Facebook posts) and "TWITTER®" by Twitter Inc. (e.g., text from tweets). Data sources 130 may also include online databases 130f that include, but are not limited to, data related to movies, television programs, music, and restaurants. Data sources 130 may also include additional types of data sources in addition to the data sources described above. Different data sources 130 may have their own content and update rate.

The search system 400 and/or the query analysis system 300 retrieves data from one or more of the data sources 130.

The data retrieved from the data sources 130 may include any type of data related to application functionality and/or application states. The search system 400 generates application state records 450 based on the data retrieved from the data sources 130. In some examples, a human operator manually generates some data included in the application state records 450. The search system 400 may update data included in the application state records 450 over time so that the search system 400 provides up-to-date search system search results 440.

An API 500 is generally a set of routines, protocols, and tools for building software applications, such as native applications 204a or web applications 204b. The API 500 provides an interface between a first application 204 and the functionality of a second application 204, which increases the functionality of the first application 204. An API 500 represents a software component in terms of its operations, inputs, outputs, and underlying types. The API 500 defines functionalities that are independent of their respective implementations, which allows definitions and implementations to vary without compromising the interface or GUI interface 230. For example, an API 500 provides the building blocks for a first application 204 to access the functionalities of a second application 204. Thus, the programmers of the first application 204 use the building blocks to access the second application's 204 functionalities. In some examples, the API 500 integrates features and functionalities of the second application 204 into the first application 204, and improves the functionality of the first application 204.

Referring to FIGS. 1A-2D, the user device 200 may be any computing device capable of providing queries 330, 332 to a query analysis system 300 and/or the search system 400. User devices 200 include, but are not limited to, mobile computing devices, such as laptops 200a, tablets 200b, smart phones 200c, and wearable computing devices 200d (e.g., headsets and/or watches). User devices 200 may also include other computing devices having other form factors, such as computing devices included in desktop computers 200e, vehicles, gaming devices, televisions, or other appliances (e.g., networked home automation devices and home appliances).

The user devices 200 may use a variety of different operating systems 224. In examples where a user device 200 is a mobile device, the user device 200 may run an operating system 224 including, but not limited to, ANDROID® developed by Google Inc., IOS® developed by Apple Inc., or WINDOWS PHONE® developed by Microsoft Corporation. Accordingly, the operating system 224 running on the user device 200 may include, but is not limited to, one of ANDROID®, IOS®, or WINDOWS PHONE®. In an example where a user device 200 is a laptop 200a or desktop computing device 200e, the user device 200 may run an operating system 224 including, but not limited to, MICROSOFT WINDOWS® by Microsoft Corporation, MAC OS® by Apple, Inc., or Linux. User devices 200 may also access the query analysis system 300 and/or the search system 400 while running operating systems 224 other than those operating systems 224 described above, whether presently available or developed in the future.

A software application 204 may refer to computer software that, when executed by a computing device, causes the computing device to perform a task. In some examples, a software application 204 may be referred to as an "application", an "app", or a "program". Example software applications 204 include, but are not limited to, word processing applications, spreadsheet applications, messaging applications, media streaming applications, social networking applications, and games.

Applications 204 may be executed on a variety of different user devices 200. In some examples, a native application 204a is installed on a user device 200 prior to a user 10 purchasing the user device 200. In other examples, the user 10 may download and install native applications 204a on the user device 200.

The functionality of an application 204 may be accessed on the computing device 200 on which the application 204 is installed. Additionally or alternatively, the functionality of an application 204 may be accessed via a remote computing device 112. In some examples, all of an application's functionality is included on the computing device 112, 200 on which the application 204 is installed. These applications 204 may function without communication with other computing devices 112, 200 (e.g., via the Internet). In other examples, an application 204 installed on a computing device 200 may access information from other remote computing devices 112 during operation. For example, a weather application installed on a computing device 200 may access the latest weather information via the Internet and display the accessed weather information to the user 10 through the installed weather application 204. This access may be accomplished through the use of APIs 500. In still other examples, a web-based application 204b (also referred to herein as a web application 204b) may be partially executed by the user's computing device 200 and partially executed by a remote computing device 112. The partial execution may be accomplished by the use of APIs 500 between the user device 200 and the remote computing device 112. For example, a web application 204b may be an application 204 that is executed, at least in part, by a web server and accessed by a web browser (e.g., a native application 204a) of the user's computing device 200. The web browser 204b may access APIs 500 associated with the web application 204b. Example web applications 204b may include, but are not limited to, web-based email, online auctions, and online retail sites.

In general, the user device 200 may communicate with a search system 400 using any software application 204 that can transmit search queries 332 to the search system 400. In some examples, the user device 200 runs a native application 204a that is dedicated to interfacing with the search system 400, such as a native application 204a dedicated to searches (e.g., a search application 216). In some examples, the user device 200 communicates with the search system 400 using a more general application 204, such as a web-browser application 204b accessed using a web browser native application 204a. Although the user device 200 may communicate with the search system 400 using the native search application 216 and/or a web-browser application 204b, the user device 200 may be described hereinafter as using the native search application 216 to communicate with the query analysis system and/or the search system 400. In some implementations, the functionality attributed to the search application 216 (which includes executing a search of the query analysis system 300 in parallel with a search of the search system 400) may be included as a searching component of a larger application 204 that has additional functionality. For example, the functionality attributed to the search application 216 may be included as part of a native application 204a or a web application 204b as a feature that provides search capabilities.

Referring to FIG. 2A, in some implementations, the user device 200 receives, via a graphical user interface (GUI)

230, a search query 332 from the user 10. The search query 332, which may include text, numbers, and/or symbols (e.g., punctuation), is entered into the user device 200 by the user 10. For example, the user 10 may enter the search query 332 into a search field 206 (e.g., a search box) of the GUI 230 of a search application 216 running on the user device 200. In some examples, the user 10 selects a search button 208 to initiate execution of the search. A user 10 may enter a search query 332 using a touchscreen keypad, a mechanical keypad, a speech-to-text program, or other form of user input. In general, a search query 332 may be a request for information retrieval (e.g., search results) from the search system 400. For example, a search query 332 may be directed to retrieving a list 251 of links 250 to application functionality or application states in examples where the search system 400 is configured to generate a list of access mechanisms 202 as search results 440, 540. A search query 332 directed to retrieving a list of links 250 to application functionality may indicate a user's desire to access functionality of one or more applications 204 described by the search query 332.

In some examples, the search query 332 is included in a query wrapper 330. The query wrapper 330 may include additional data along with the search query 332. For example, the query wrapper 330 may include geo-location data that indicates the location of the user device 200, such as latitude and longitude coordinates. The user device 200 may include a global positioning system (GPS) receiver that generates the geo-location data 334 transmitted in the query wrapper 330. The query wrapper 330 may also include an IP address 338, which the search module 410 may use to determine the location of the user device 200. In some examples, the query wrapper 330 also includes additional data, including, but not limited to, platform data 336 (e.g., version of the operating system 224, device type, and web-browser version), an identity of a user of the user device 200 (e.g., a username), partner specific data, and other data.

The query analysis system 300 receives the search query 332 (included in the query wrapper 330) and analyses the received search query 332 to generate additional information 340 associated with the search query 332. Once generated, the query analysis system 300 sends the additional information to the user device 200. The additional information 340 may include one or more of API selection data 342, API querying data 344, and search result display data 346.

The API selection data 342 enables the user device 200 to select one or more of the APIs 500 accessible via the user device 200 to query using the search query 332. In some examples, the API selection data 342 includes one or more query parses associated with the search query 332. Each query parse may include a text string (e.g., one or more characters and/or terms of the search query 332), a domain associated with the text string, and a probability value associated with the domain (e.g., an indication of a degree of confidence that the domain is correctly associated with the text string). A domain may indicate if the text string describes a particular type of business, product, service, location, etc. For example, the query analysis system 300 may associate a text string with a domain by matching the text string to an entity also associated with the domain (e.g., the entity may be associated with an action, which may correspond to the domain). In this manner, the query parse(s) of the search query 332 may represent one or more interpretations of the search query 332, or indications of its possible intent that enables the user device 200 and the search system 400 to better focus their respective searches for application states or application state records 450 using the search query 332. Specifically, the user device 200 may select one or more (e.g., a subset) of the APIs 500 accessible via the user device 200 using the domains and probability values (e.g., select APIs 500 matching the most likely domains), and query the selected APIs 500 using the search query 332 (e.g., using an API request 532 generated using the query, as described below). Similarly, the search system 400 may query the search data store 430 using the search query 332, and, in some examples, the domains and probability values. In some examples, the API selection data 342 indicates one or more domains and, in additional examples, corresponding probability values associated with the search query 332 (e.g., a topic vector) without any query parses. The domains and the probability values may similarly dictate which of the APIs 500 are queried by the user device 200 and/or which application state records 450 of the search data store 430 are identified by the search system 400 using the search query 332. As another example, in cases where the query analysis system 300 has knowledge of the APIs 500 accessible via the user device 200, the API selection data 342 may explicitly indicate which of the APIs 500 should be queried by the user device 200 using the search query 332.

In some implementations, the additional information 340 includes API querying data 344 that enables the user device 200 to query one or more APIs 500 accessible via the user device 200 using the search query 332. The API querying data 344 may include one or more API requests 532, or instructions for generating the API requests 532. Each API request 532 may correspond to a version of the search query 332 (e.g., a query rewrite) corrected for spelling, modified based on entity and/or location matches, and/or parameterized for a specific API query interface. As also described herein, the API requests 532 may be generated by the query analysis system 300 and included in the API querying data 344, or by the user device 200 using the API querying data 344 received from the query analysis system 300. The user device 200 may transmit the API requests 532 to one or more APIs 500 accessible via the user device 200 to query the APIs 500 using the search query 332.

In additional implementations, the additional information 340 includes search result display data 346 that enables the user device 200 to display the API 500 and search system search results 440, 540 to the user 10 as one or more user selectable links 250. In some examples, the search result display data 346 includes the probability values associated with the query parses and/or domains previously described. The probability values may be used to direct both the selection of the APIs 500 accessible via the user device 200, as described above, and in scoring and ranking the API search results 540 generated by querying the selected APIs 500 for displaying the results. In one example, the probability values may be used as result scores 542 for the API search results 540 (e.g., a probability value associated with a domain used to select a particular API 500 may be used as, or influence the generation of, a result score for an API search result 540 received from the API 500). As another example, the probability values may be used as "weights" to generate the result scores 542 (e.g., using other data received from the selected APIs 500 along with the API search results 540, such as popularity ratings or other ranking metrics associated with the results). In these examples, the search system search results 440 may also include associated result scores 442. The search result display data 346 may directly indicate how the user device 200 should display the API search results 540 and the search system search results 440 (e.g., randomly, in the order received from the selected APIs 500 and the search system 400, grouped by API 500 or search system 400 origin and ranked within each group, or combined using associated result scores 542,442).

Figure 2C:
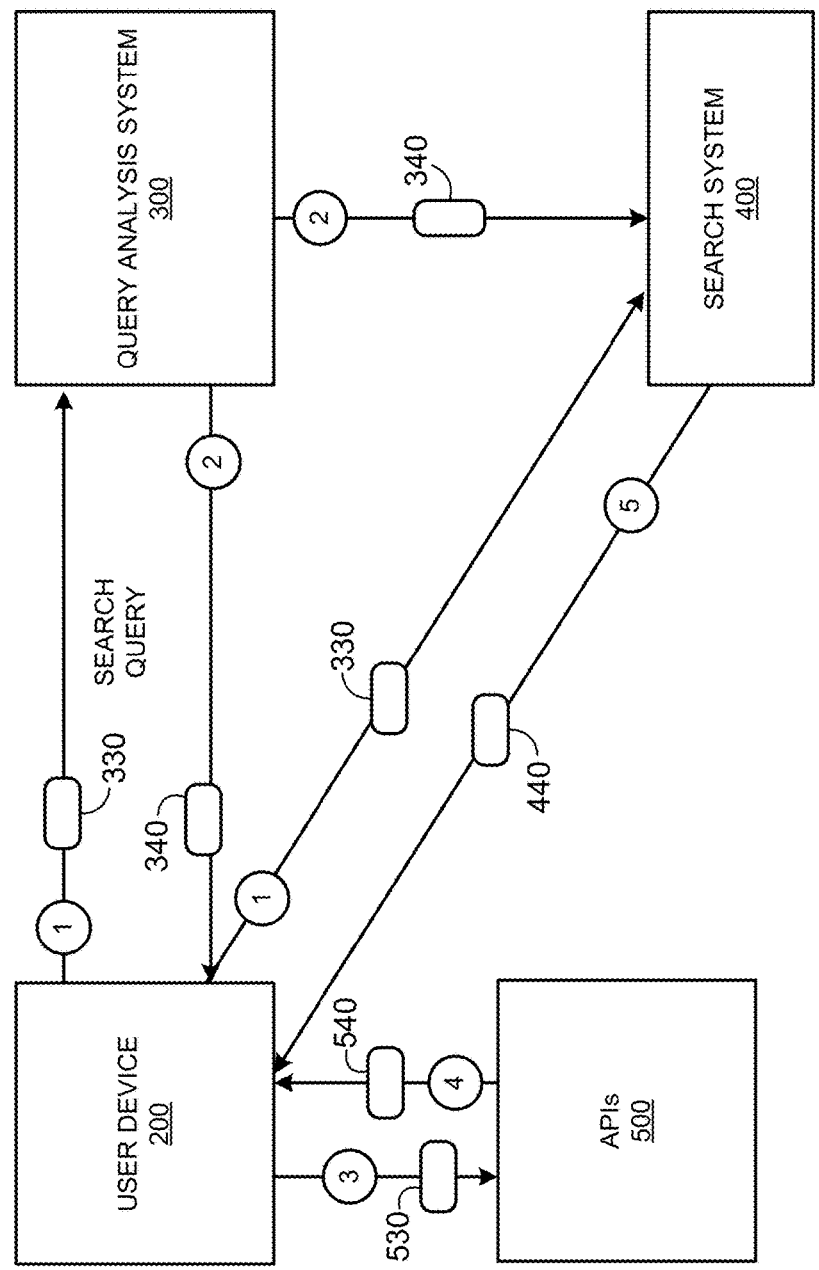
Figure 2D:
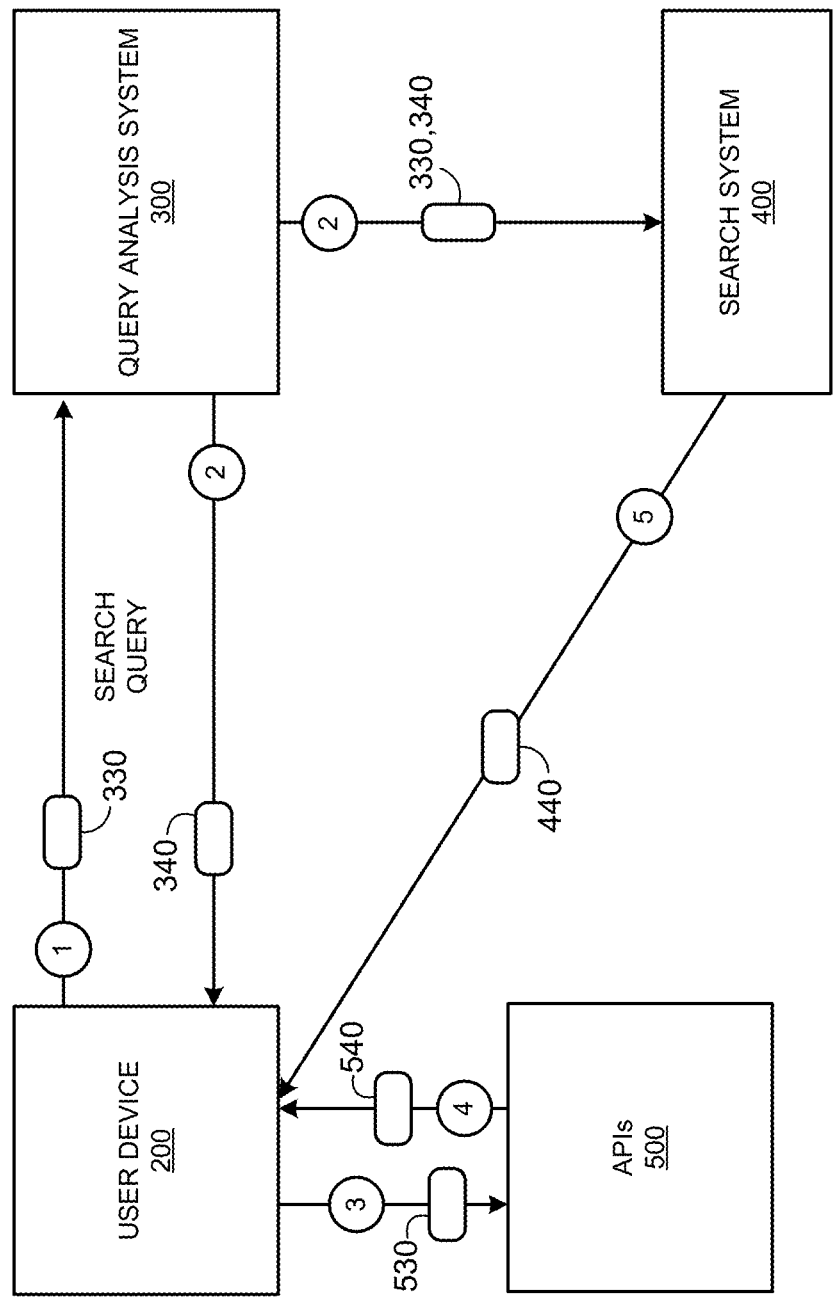

The query analysis system 300 transmits the additional information 340 to the user device 200 (FIG. 2B), or to both the user device 200 and the search system 400 (FIGS. 2C and 2D). In some examples, where the query analysis system 300 is part of the search system 400, the additional information 340 is readily available (e.g., forwarded by the query analysis system 300) to the search system 400. In these examples, the search query 332 (and query wrapper 330) may also be available (e.g., forwarded by the query analysis system 300) to the search system 400 (FIG. 2C). In other examples, the search system 400 may receive the search query 332 from the user device 200 (FIGS. 2C and 2D).

When the user device 200 receives the additional information 340, the search system 400 executes a search of the search data store 430 and the user device 200 executes a search of APIs 500 (i.e., APIs 500 associated with applications 204 downloaded on the user device 200), where both searches are based on the search query 332. In some implementations, the user device 200 sends to one or more APIs 500 an API query wrapper 530 associated with each API 500 including API requests 532, subscription data 534, geo-location data 334, platform data 336, and IP address 338. An API request 532 is a request to access a specific API 500 or to generate a list of APIs 500 that are accessible by the user device 200. Subscription data 534 includes data relating subscriptions to APIs 500 that the user device 200 may be subscribed to access mechanisms for accessing the subscription based services. Geo-location data 334 may include a location of the user device 200, such as latitude and longitude coordinates. Platform data 336 is information related to the specific software platform in use and/or the type of user device 200 (e.g., version of the operating system 224, device type, and web-browser version). The IP address 338 is the communications address for the specific user device 200 in communication with the query analysis system 300 and/or the search system 400. For example, the YELP® application may include an API 500 for accessing search specific locations that may only be accessed by the user device 200 in that location. Other examples of APIs 500 that are accessed through the user device 200 are applications 204 that require paid subscriptions, such as certain news applications 204. The API query wrapper 530 allows the specific API 500 to be accessed and return API search results 540. The API search results 540 may be included with the search system search results 440 based on their results scores 542.

The APIs 500 include one or more APIs 500a-500n associated with applications 204 installed on the user device 200. One or more APIs 500 receive the API query wrapper 530 from the user device 200. As previously discussed, the API query wrapper 530 includes one or more API requests 532, subscription data 534, geo-location data 334, platform data 336, and IP address 338. In some examples, API search results 540 include access mechanisms 202, result scores 442, and link data 444 to be used by the user device 200 to provide relevant search results.

Therefore, the execution of two parallel searches allows the system 100 to perform parallel searching of both the search system 400 and the APIs 500, allowing the user device 200 to receive search system search results 440 and API search results 540 and display the combined results 440, 540 to the user device 200. The system 100 provides a more comprehensive search for application states that provide functionality specified by the search query 332, which lead to search results 440, 540 that are more relevant to the search query 332 and to the user 10. Moreover, parallel searching allows the system 100 to access search results 440, 540, specifically API search results 540 that are accessible only through the user device 200 (e.g., via installed applications and/or subscription services. As a result, information not accessible using traditional server-based searching techniques (e.g., real-time data, or other data available exclusively by querying APIs) may be uncovered during the searches.

The search system 400 may implement a search based on the search query 332 (included in the search query wrapper 330) that includes search criteria received from the user device 200. The search system 400 generates search system search results 440 in response to the received search query 332 and transmits the search system search results 440 to the user device 200. Search system search results 440 include various access mechanisms 202 for accessing applications 204 or functionality of applications 204 relevant to the search query 332 of the user 10. In response to selection of an access mechanism 202, the user device 200 may launch an application 204 referenced in the application access mechanism 202 and perform the one or more operations indicated in the application access mechanism 202. The search system 400 may include the query analysis system 300.

In some implementations, the search system 400 includes a search module 410 in communication with a search result generation module 320 and a search data store 430. The search data store 430 may include one or more databases, indices (e.g., inverted indices), tables, files, or other data structures, which may be used to implement the techniques of the present disclosure. The search module 410 receives a search query wrapper 330 and generates search system search results 440 based on the data included in the data store 430. In some implementations, the search module 410 receives a query wrapper 330 from the user device 200 or from the query analysis system 300 and performs a search for application state records 450 included in the search data store 430 based on data included in the query wrapper 330, such as a search query 332. The application state records 450 include one or more access mechanisms 202 that the user device 200 can use to access different functions for a variety of different applications, such as native applications 204a installed on the user device 200. The search module 410 transmits search results 440, 540 including a list of access mechanisms 202 to the user device 200 that generated the search query wrapper 330.

The user device 200 receives the additional information 340 from the query analysis system 300 and generates one or more API search results 540 (i.e., displayed search results 250). Each displayed API search result 250 includes one or more access mechanism 202 (e.g., application access mechanism) based on the search query 332 and the additional information 340 (e.g., the API selection data 342 and the API querying data 344), as described below. The API search results 540 may be displayed as user selectable links 250 (displayed API search results 250). In parallel, the search system 400 also receives the search query 332 and, in some examples, the additional information 340 from one or more user device 200 and the query analysis system 300. The search system 400 then generates one or more search system search results 440 including one or more application access mechanisms 202a, web access mechanism 202b, and/or download mechanism 202c, using the search query 332 and the additional information 340. The search system 400 transmits the search system search results 440 to the user device 200. Therefore, the displayed search results 250 include search system search results 440 and API search results 540.

The user device 200 receives the search system search results 440 from the search system 400 and displays the API search results 540 and search system search results 440 to the user 10 as one or more user selectable links 250. In some examples, the user device 200 displays the API search results 540 and the search system search results 440 using the additional information 340 (e.g., the search result display data 346). Each user selectable link 250 includes one of the access mechanisms 202 included in the API search results 540 and the search system search results 440 and, e.g., link data 444, 544 also received as part of the search results 440, 540. The search system search results 440 and the API search results 540 may return an access mechanism 202 associated with specific link data 444, 544. The user device 200 uses the link data 444, 544 to generate and display the user selectable link(s) 250 associated with each of the search results 440, 540. Upon a user's selection of a user selectable link 250, the web access mechanism 202 may direct the user device 200 to open a state of an application.

Once the APIs 500 execute the search and send API search results 540 to the user device 200 and the search system 400 executes a search of its database 430 and sends the search system search results 440 to the user device 200, the user device 200 generates user selectable links 250 based on the received search results 440, 540. The API search results 540 are results associated with native applications 204a installed on the user device 200 while the search system search results 440 includes results that may not be associated with native applications 204a installed on the user device 200. The search results 440, 540 received by the user device 200 from the search system 400 and the APIs 500 reduce the amount of processing, data storage resources, and time required to perform the searches. For example, by enabling the query analysis system 300 to analyze the search query 332 (i.e., to generate the additional information 340 associated with the search query 332) prior to the user device 200 and the search system 400 performing their respective searches using the search query 332, the searches may be better focused and thus use fewer processing and data storage resources and less time. Specifically, using the search query 332 and the additional information 340 (e.g., the API selection data 342), the user device 200 may query a subset of the APIs 500 it would otherwise query using the search query 332. Additionally, using the additional information 340 (e.g., the API querying data 344), the user device 200 may query the subset of the APIs 500 in a more tailored (e.g., specific, or structured) manner than using the search query 332 alone, again resulting in a more focused and efficient search. Similarly, using the additional information 340 (e.g., the domains and the probability values), the search system 400 may search a subset of the application state records 450 it would otherwise search using the search query 332. As another example, by enabling the user device 200 and the search system 400 to perform their respective searches separately (e.g., in parallel), the techniques may enable performing the overall search in less time.

The user device 200 generates user selectable links 250 based on the received search results 440, 540 (e.g., links 250a, 250b, 250c of FIG. 2A). Each user selectable link 250 displayed to the user 10 may include an access mechanism 202. The user 10 may select a user selectable link 250 on the user device 200 by interacting with the link 250 (e.g., touching or clicking the link). In response to selection of a link 250, the user device 200 may launch a corresponding software application 204 (e.g., a native application 204a (API search result 540) or a web-browser application 204b (search system search result 440)) referenced by the access mechanism 202 and perform one or more operations indicated in the access mechanism 202.

Access mechanisms 202 may include at least one of a native application access mechanism 202a (hereinafter "application access mechanism"), a web access mechanism 202b, and an application download mechanism 202c. The user device 200 may use the access mechanisms 202 to access functionality of applications 204. For example, the user 10 may select a user selectable link 250 including an access mechanism 202 in order to access functionality of an application 204 indicated in the user selectable link 250. The search module 410 may transmit one or more application access mechanisms 202a, one or more web access mechanisms 202b, and one or more application download mechanisms 202c to the user device 200 in the search results 440, 540.

An application access mechanism 202a may be a string that includes a reference to a native application 204a and indicates one or more operations for the user device 200 to perform. If a user 10 selects a user selectable link 250 including an application access mechanism 202a, the user device 200 may launch the native application 204a referenced in the application access mechanism 202a and perform the one or more operations indicated in the application access mechanism 202a.

An application access mechanism 202a includes data that the user device 200 can use to access functionality provided by a native application 204a. For example, an application access mechanism 202a can include data that causes the user device 200 to launch a native application 204a and perform a function associated with the native application 204a. Performance of a function according to the access mechanism 202 may set the native application 204a into a specified state. Accordingly, the process of launching a native application 204a and performing a function according to an application access mechanism 202a may be referred to herein as launching the native application 204a and setting the native application 204a into a state that is specified by the application access mechanism 202a. In some examples, an application access mechanism 202a for a restaurant reservation application can include data that causes the user device 200 to launch the restaurant reservation application and assist in making a reservation at a restaurant. In such examples, the restaurant reservation application may be set in a state that displays reservation information to the user 10, such as a reservation time, a description of the restaurant, and user reviews. In additional examples, an application access mechanism 202a for an internet media player application can include data that causes the user device 200 to launch the internet media player application and stream media from the Internet. In such examples, the internet media player application may be set in a state that displays information regarding the media (e.g., music) being streamed, such as a song name, an artist, or an album name.

Application access mechanisms 202a may have various different formats and content. The format and content of an application access mechanism 202a may depend on the native application 204a with which the application access mechanism 202 is associated and the operations that are to be performed by the native application 204a in response to selection of the application access mechanism 202a. For example, an application access mechanism 202a for an internet music player application may differ from an application access mechanism 202a for a shopping application.

An application access mechanism 202a for an internet music player application may include references to musical artists, songs, and albums, for example. The application access mechanism 202a for an internet music player application may also reference operations, such as randomizing a list of songs and playing a song or album. An application access mechanism 202a for a shopping application may include references to different products that are for sale. The application access mechanism 202a for the shopping application may also include references to one or more operations, such as adding products to a shopping cart and proceeding to a checkout.

The search system 400 and/or the APIs 500 may transmit additional data in the search results 440, 540 along with the application access mechanisms 202a. For example, the search system 400 and/or the APIs 500 may transmit data (e.g., text and/or images), which may be used by the user device 200 to generate user selectable links 250 in the search results 440, 540. A link 250 may include text and/or images that the user 10 may select (e.g., touch) via a user interface 230 displayed on a display 201 (e.g., a display or touch screen) of the user device 200. Each user selectable link 250 may be associated with an application access mechanism 202a such that when the user 10 selects a link 250, the user device 200 launches the native application 204a referenced in the application access mechanism 202a and performs the one or more operations indicated in the application access mechanism 202a. The text and/or images of a link 250 displayed to the user 10 may indicate the operations that will be performed in response to selection of the link 250. For example, if the link 250 is to a song in a music playing application, the text and/or images may identify the music application that will be launched by the user device 200 and the song that will be played by the music playing application when the user 10 selects the link 250.

The GUI 230 may include indicators or icons 209 that indicate whether an application 204a is currently installed on the user device 200. The indicators or icons 209 may indicate whether the native application 204a is installed and ready for access by the user 10, or whether the application 204 is not yet installed, thus inaccessible by the user 10, but may be downloaded to the user device 200. For example, an "Open" icon 209a may indicate that a native application 204a is installed on the user device 200, and the user may select (e.g., touch) an "Open" icon 209a to open the installed native application 204a.

A "Free" or "Download" icon 209b may indicate that the application 204a is not currently installed on the user device 200; however, the user 10 may select the "Free" or "Download" icon 209b to launch a digital distribution platform 130b, such as an application marketplace that provides the native application 204a for download or to automatically start downloading the native application 204a to the user device 200. Other indicators or icons 209 are possible as well that show various states of installation and/or accessibility of native applications 204a.

The user 10 may select a link 250 that causes the user device 200 to launch the native application 204a identified in the link 250 and perform one or more operations according to the application access mechanism 202a associated with the link 250. Put another way, when the user 10 selects a link 250, the user device 200 launches a native application 204a and sets the native application 204a into a state defined by the application access mechanism 202a associated with the link 250. In general, a state of a native application 204a may refer to the operations and/or the resulting outcome of the native application 204a in response to selection of a link 250. A state of a native application 204a may also be referred to herein as an "application state."

An application state specified by an application access mechanism 202a may depend on the functionality provided by the native application 204a. For example, if a native application 204a is configured to retrieve and display information from the Internet, the native application 204a can be set into a state in which the native application 204a retrieves information from the Internet and displays information to the user 10. In another example, if a native application 204a is configured to play media (e.g., music and/or video) from the Internet, the native application 204a can be set into a state in which the native application 204a is playing a song or a movie from the Internet. In another example, if a native application 204a is configured to make restaurant reservations, the native application 204a can be set into a state in which the native application 204a displays available restaurant reservations to the user 10.

A web access mechanism 202b may include a resource identifier that includes a reference to a web resource (e.g., a page of a web application/website). For example, a web access mechanism 202b may include a uniform resource locator (URL) (i.e., a web address) used with hypertext transfer protocol (HTTP). If a user 10 selects a user selectable link 250 including a web access mechanism 202b, the user device 200 may launch the web browser application 204b and retrieve the web resource indicated in the resource identifier. Put another way, if a user 10 selects a user selectable link 250 including a web access mechanism 202b, the user device 200 may launch a corresponding web-browser application 204b and access a state (e.g., a page) of a web application/website. In some examples, web access mechanisms 202b include URLs for mobile-optimized sites and/or full sites.

The web access mechanism 202b included in an application state record 450 may be used by a web browser to access a web resource that includes similar information and/or performs similar functions as would be performed by a native application 204a that receives an application access mechanism 202a of the application state record 450. For example, the web access mechanism 202b of an application state record 450 may direct the web-browser application 204b of the user device 200 to a web version of the native application 204a referenced in the application access mechanisms 202a of the application state record 450. Moreover, if the application access mechanisms 202 included in an application state record 450 for a specific Mexican restaurant cause each application edition to retrieve information for the specific Mexican restaurant, the web access mechanism 202b may direct the web-browser application 204b of the user device 200 to a web page entry for the specific Mexican restaurant.

An application download mechanism 202c may indicate a location (e.g., a digital distribution platform 130b) where a native application 204a can be downloaded in the scenario where the native application 204a is not installed on the user device 200. If a user 10 selects a user selectable link 250 including an application download mechanism 202a, the user device 200 may access a digital distribution platform from which the referenced native application 204a may be downloaded. The user device 200 may access a digital distribution platform 130b using at least one of the web-browser application 204b and one of the native applications 204a.

The search module 410 and/or the APIs 500 may use the search query 332, the additional data included in the search query wrapper 330, and the additional information 340 to generate the search results 440, 540. For example, the search module 410 determines a geo-location of the user device 200, which the search module 410 can use along with the search query 332 to generate the search results 440, 540. The search module 410 and/or the APIs 500 can determine the geo-location of the user device 200 based on the geo-location data 334 or other data (e.g., IP address 338) included in the search query wrapper 330. In some implementations, the search module 410 detects a location (e.g., a postal address, street name, city name, etc.) specified in the search query 332 (i.e., a query-specified location). In these implementations, the search module 410 can use the query-specified location along with the search query 332 to generate the search system search results 440.

The search module 410 performs a search for application state records 450 included in the search data store 430 in response to the received search query wrapper 330 (e.g., in response to the search query 332 and the geo-location data 334) and/or the additional information 340. In some implementations, the search module 410 generates result scores 442 for application state records 450 identified during the search. The result score 442 associated with an application state record 450 may indicate the relevance of the application state record 450 to the search query 332. A higher result score 442 may indicate that the application state record 450 is more relevant to the search query 332. The search module 410 may retrieve access mechanisms 202 from the scored application state records 450. The search module 410 can transmit a result score 442 along with an access mechanism 202 retrieved from a scored application state record 450 in order to indicate the rank of the access mechanism 202 among other transmitted access mechanisms 202.

An application access mechanism 202a included in an application state record 450 may be an application resource identifier or a string that includes a reference to a native application 204a and/or indicates one or more operations for execution by the native application 204a on the user device 200. An application resource identifier is a string having an application specific scheme in some examples. For example, the application resource identifier may include a reference to a native application 204a, a domain name, and a path to be used by the native application 204a to retrieve and display information to the user 10. In some examples, an application resource identifier is an application specific resource identifier that is defined by the developer of the application 204. In this example, the search application 216 receives the application resource identifier and the operating system 224 may send the application resource identifier to the native application 204a referenced in the application resource identifier. The native application 204a referenced in the application resource identifier launches and is set into the state specified by the application resource identifier.

In some examples, the application access mechanism 202a includes operations for the user device 200 to perform in addition to the operation(s) indicated in the application resource identifier. For example, the search application 216, the operating system 224, and/or a native application 204a on the user device 200 may perform the operations included in the application access mechanism 202a. In some examples, a script includes the operations. Examples of operations may include, but are not limited to, launching a native application 204a, creating and sending a search request 332 (via a search wrapper 330) to an application server, setting a current geographic location in a native application 204a, making a restaurant reservation, sending a text message, and adding an appointment to a calendar.

In some examples, an application access mechanism 202a does not include an application resource identifier. Instead, the application access mechanism 202a includes one or more operations that reference a native application 204a and indicate one or more operations for execution by the user device 200. The one or more operations may include instructions for at least one of the search application 216, the operating system 224, and/or a native application 204a on the user device 200. In response to selection of the application access mechanism 202a, the user device 200 may perform the operations included in the application access mechanism 202a. In some examples, the operations are included in a script.

In some examples, an application function is not be accessible using an application resource identifier. For example, a function of the application may not include a corresponding application resource identifier that the application 204 may use to perform the function. As another example, some applications 204 may not be configured to receive application resource identifiers. In these examples, an application access mechanism 202 for the native application 204a can include one or more operations that cause the native application to perform the function that may not otherwise be accessible using an application resource identifier. For example, the search application 216 may receive the one or more operations and execute the one or more operations to set the native application 204a into the desired application state. In some examples, the one or more operations include launching the native application 204a along with additional operations for the native application 204a to perform. For example, the search application 216 may initially trigger the native application 204a to start and then wait for a period of time for the native application 204a to start. Then the search application 216 may perform additional operations included in the received application access mechanism 202, such as issuing a search instruction to the native application 204a.

In still other examples, a native application 204a may be configured to directly receive the operations transmitted by the system 100. In these examples, the native application 204a may be launched according to the application access mechanism 202 and then the launched native application 204a may directly perform the operations received from the system 100.

A single native application 204a can provide a variety of different functionalities. For example, a restaurant reservation application can access reviews for a variety of different restaurants and set up reservations at a variety of different restaurants. Similarly, a travel application can book hotels, book flights, and provide reviews for different travel destinations. The different functionalities associated with a single native application may be accessed using a plurality of different application access mechanisms. For example, with respect to the restaurant reservation application, the search data store 430 may include application state records 450 having different application access mechanisms 202 for accessing different restaurant reviews and setting up reservations. Similarly, the search data store 430 may include application state records 450 having different application access mechanisms 202 for booking hotels, booking flights, and accessing reviews for different travel destinations.

The application access mechanisms 202 for a single native application 204a may vary in complexity. In some examples, the application access mechanisms 202 causes a native application 204a to launch (e.g., the operating system 224 may be instructed to launch the application 204) and then perform additional operations after launching, as described above. In other examples, application access mechanisms 202 may cause an application 204 to launch into a default state (e.g., a default homepage) without performing any additional operations. An application state record 450 including an application access mechanism 202 that causes an application 204 to launch into a default state may be thought of as an access mechanism 202 that is related to the native application 204*a*, but not any particular state, which may be accessed by the application 204.

The search module 410 may transmit additional data to the user device 200 along with the access mechanisms 202 and the result score(s) 442. For example, the search module 410 may transmit data (e.g., text and/or images) to be included in the user selectable links 250. Data for the user selectable links 250 (e.g., text and/or images) may be referred to herein as "link data" (e.g., link data 444). The user device 200 displays the user selectable links 250 to the user 10 based on received link data 444. Each user selectable link 250 may be associated with an access mechanism 202 included in the search results 440, 540, such that when a user 10 selects a link 250, the user device 200 launches the application 204 referenced in the access mechanism 202 and sets the application 204 into the state specified by the access mechanism 202.

With reference to FIG. 2A, the user device 200 may receive a set of search results 440, 540 from the search module 410 and/or the APIs 500 in response to transmission of the search query wrapper 330. The GUI 230 of the search application 216 displays (e.g., renders) the search results 440, 540 received from the search module 410 and/or the APIs 500. The search application 216 may display the search results 440, 540 to the user 10 in a variety of different ways, depending on what information is transmitted to the user device 200. In examples where the search results 440, 540 include a list of access mechanisms 202 and link data 444, 544 associated with the access mechanisms 202, the search application 216 may display the search results 440, 540 to the user 10 as a list 251 of user selectable links 250 including text and images. The text and images in the links 250 may include application names associated with the access mechanisms 202, text describing the access mechanisms 202, images associated with the application 204 referenced by the access mechanisms 202 (e.g., application icons), and images associated with the application state (e.g., application screen images) defined by the access mechanisms 202.

In some implementations, the search application 216 displays the search results 440, 540 as a list 251 of links 250 arranged under the search field 206 in which the user 10 entered the search query 332. Moreover, the search application 216 may arrange the links 250 in order based on result scores 442, 542 associated with the access mechanisms 202 included in the links 250.

Each of the links 250 includes link data 444, 544. For example, each of the links 250 may include an image (e.g., an icon) and text (e.g., an application or business name) that may describe an application and a state of an application. Each of the links 250 may include an access mechanism 202 so that if a user 10 selects one of links 250, the user device 200 launches the application 204 and sets the application 204 into a state that is specified by the access mechanism 202 associated with the selected link 250. In some implementations, the user device 200 arranges the links 250 based on result scores associated with the access mechanisms 202 included in the links 250. In some implementations, as illustrated in FIG. 2B, links 250 for the same application 204 are combined together in the search results 440, 540 displayed to the user 10.

With respect to FIG. 2A, it may be assumed that the native application 204*a* for TRIPADVISOR® developed by TripAdvisor, Inc., and the native application 204*b* for YELP® developed by Yelp, Inc., are installed on the user device 200. Links 250*a*, 250*b* may be to applications 204 already installed on the user device 200. Link 250*c* is an application 204 for IMDb®, for example that may be downloaded to the user device 200, if the user selects the download button 209*b*.

The GUI 230 includes the name "TripAdvisor" under which the link 250*a* is arranged. Selection of link 250*a* may cause the user device 200 to launch the TRIPADVISOR® native application 204*a* and retrieve an entry for "Holiday Inn Hotel & Suites" in the TRIPADVISOR® native application 204*a* (e.g., a search for "Late night diners"). Selection of link 250*b* may cause the user device 200 to launch the YELP® native application 204*b* and retrieve a Holiday Inn Diner restaurant entry of the YELP® native application 204*b*. Selection of link 250*c* (or selection of the download icon 209*b*) may cause the user device 200 to download the IMDb® native application 204*a*. After downloading the IMDb® native application 204*a*, the user device 200 may then launch and retrieve an entry to "Holiday Inn—The Movie". The search module 410 and/or the APIs 500 may be configured to transmit any combination of application access mechanisms 202*a*, web access mechanisms 202*b*, and application download mechanisms 202*c* in the search results 440, 540.

Figure 11A:
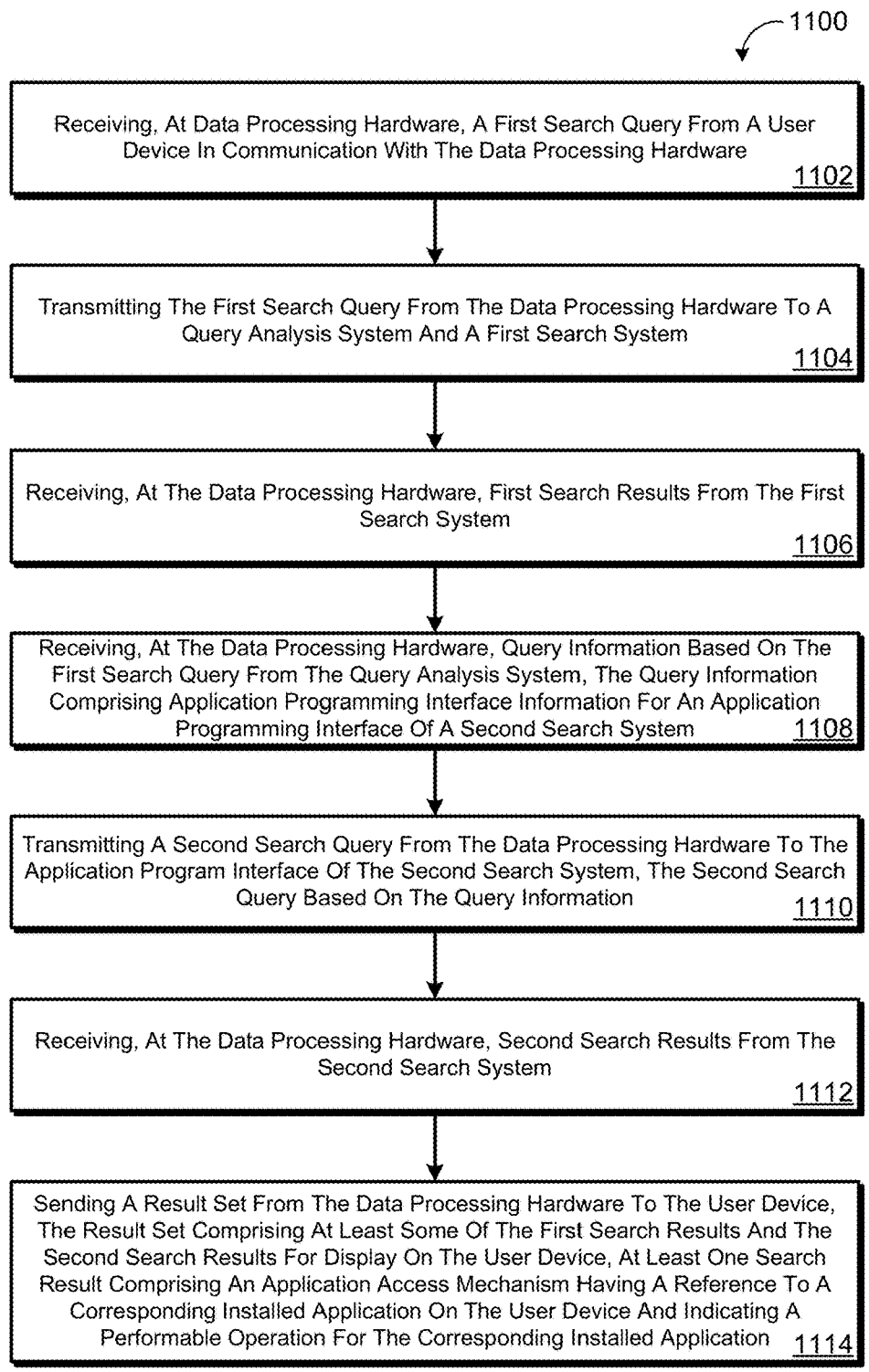
FIG. 11A is an example arrangement of operations for a method for displaying search results on a display of a user device based on a search query inputted via the display by a user.
Figure 11B:
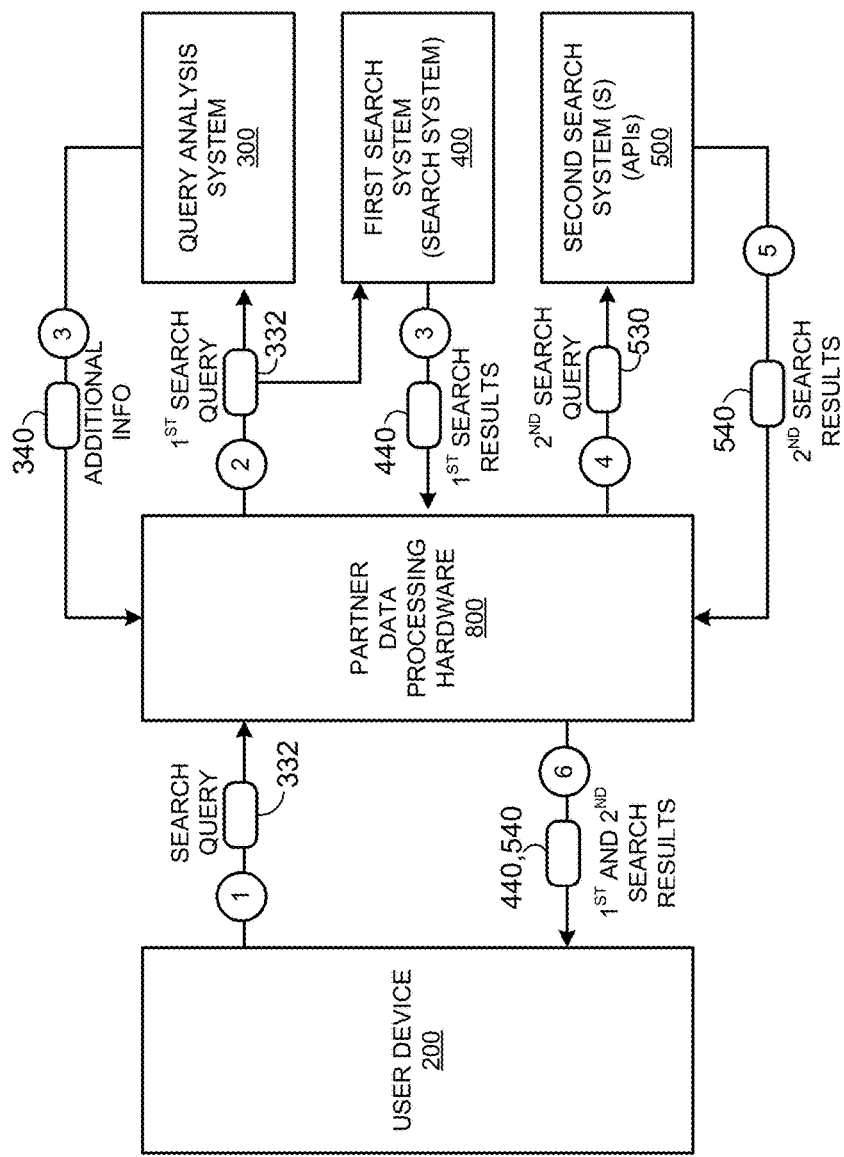
FIG. 11B is a schematic view of an example system that can execute the method illustrated in FIG. 11A.

In some examples, user devices 200 communicate with the search system 400 and/or the APIs 500 via a partner computing system (See FIGS. 11A and 11B). The partner computing system may be a computing system of a third party that may leverage the search functionality of the search system 400 and/or the APIs 500. The partner computing system may belong to a company or organization other than that which operates the search system 400. Example third parties which may leverage the functionality of the search system 400 may include, but are not limited to, internet search providers and wireless communications service providers. The user devices 200 may send search queries to the search system 400 and/or the APIs 500 and receive search results 440, 540 via the partner computing system. The partner computing system provides a user interface to the user devices 200, in some examples, and/or modifies the search experience provided on the user devices 200.

Figure 3A:
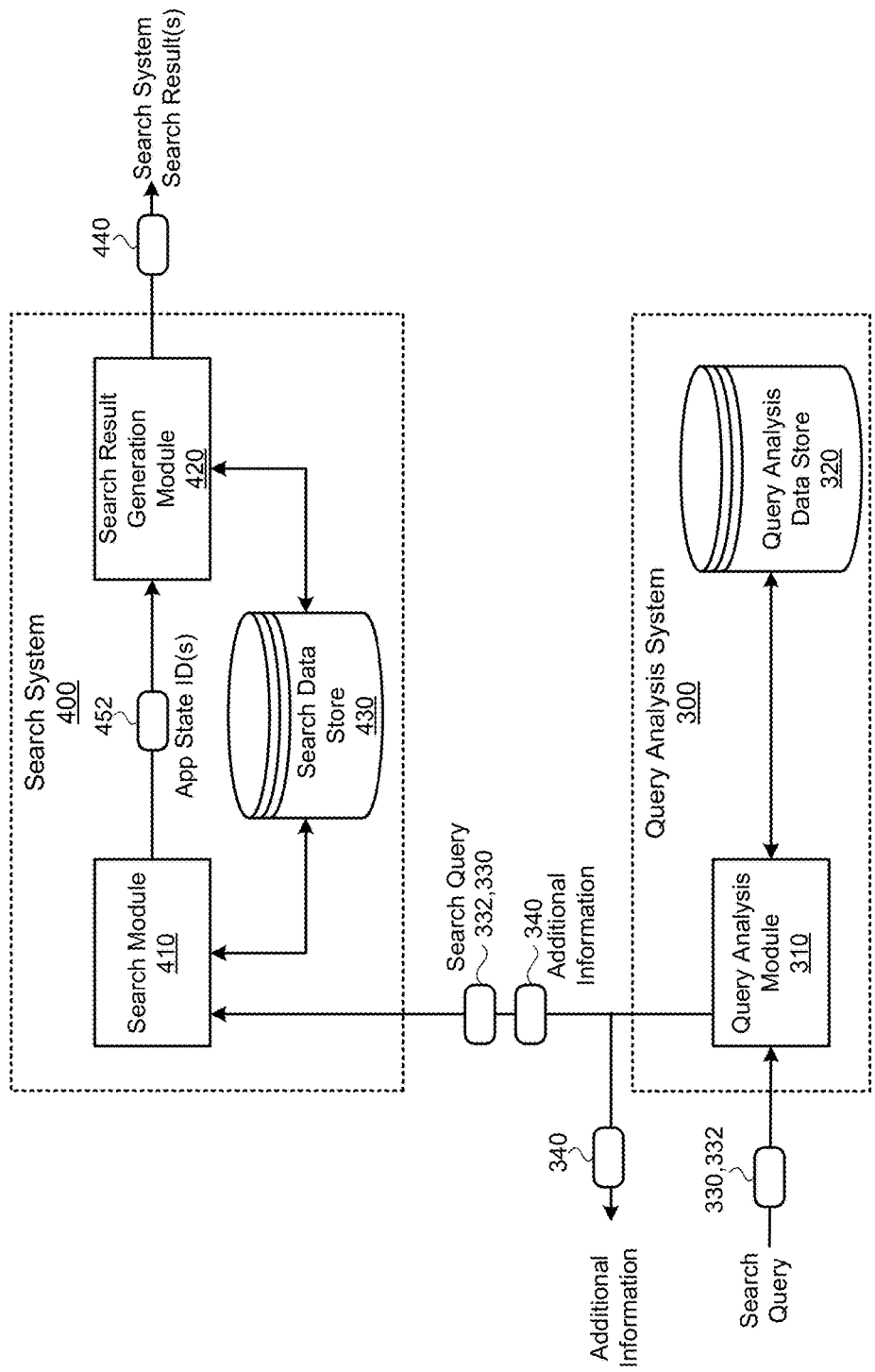
FIG. 3A is a schematic view of an example query analysis system in communication with an example search system.
Figure 3B:
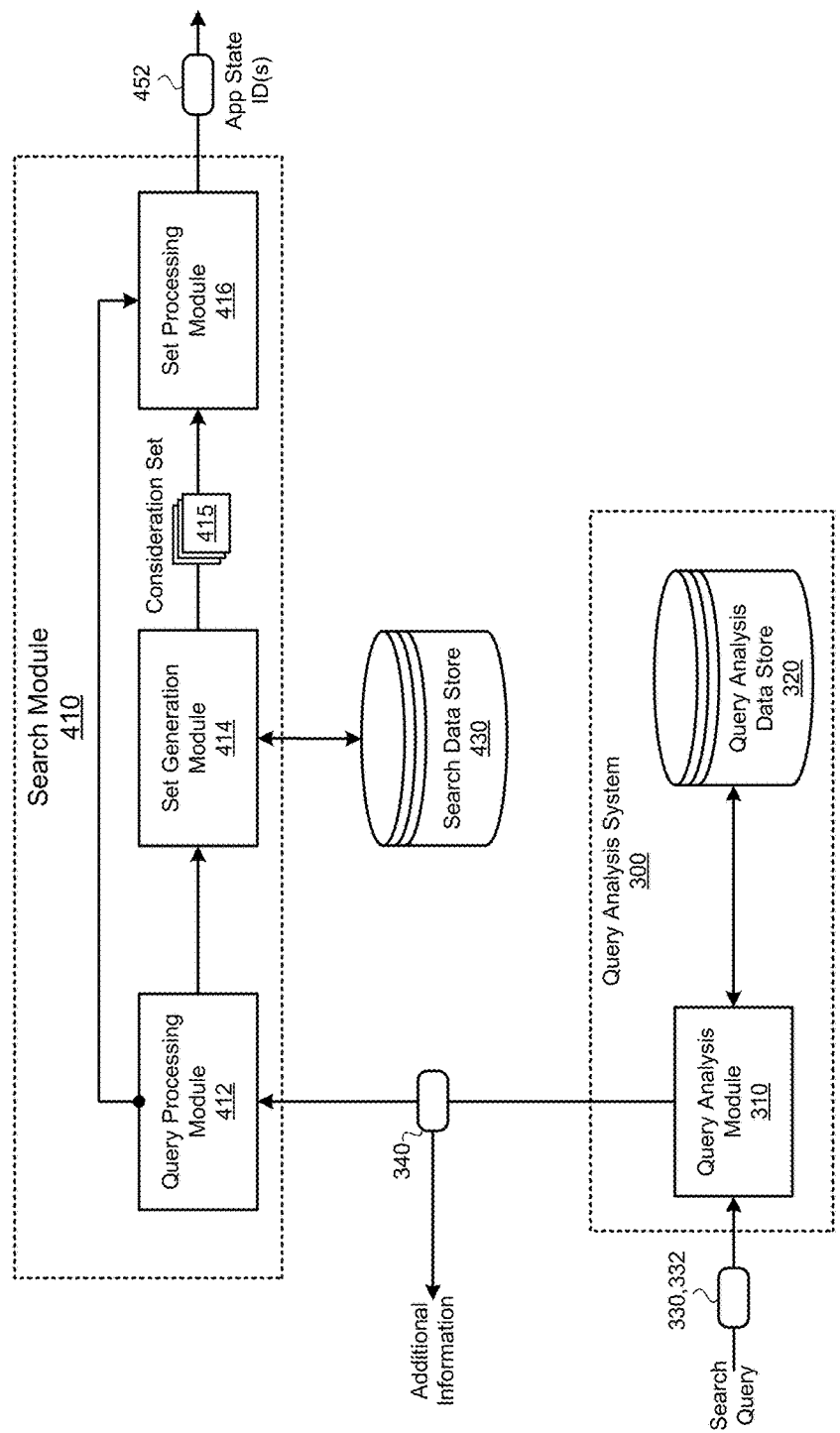
FIG. 3B is a schematic view of an example query analysis system in communication with an example search module.
Figure 3C:
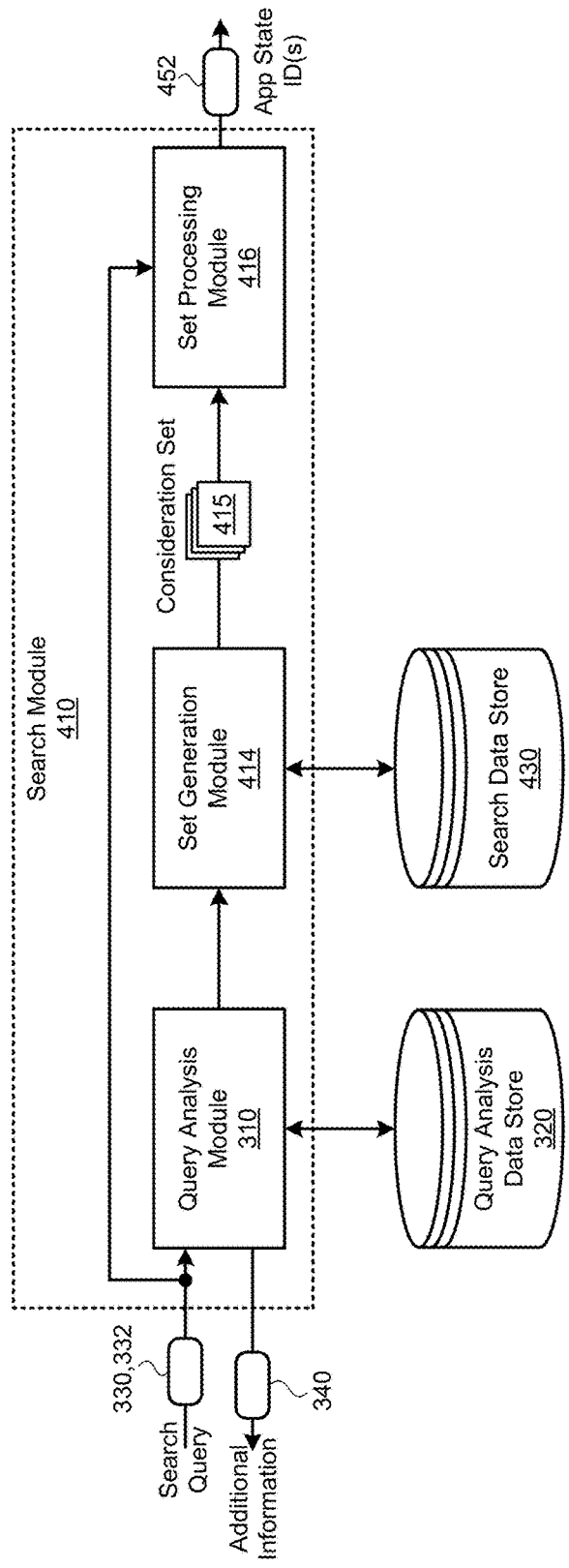
FIG. 3C is a schematic view of an example search module including a query analysis system.

FIGS. 3A-3C illustrates examples of the query analysis system 300 and the search system 400. Referring to FIG. 3A, the query analysis system 300 receives a search query 332 from a user device 200, analyzes the search query 332 to generate additional information 340 associated with the search query 332 (i.e., one or more of API selection data 342, API querying data 344, and search result display data 346), and transmits the additional information 340 to the user device 200 and, in some examples, to the search system 400. For example, the query analysis module 310 may use various processing resources and data (e.g., keywords, tables, etc.) included in the query analysis data store 320 to generate the additional information 340. The search system 400 also receives the search query 332, e.g., from the user device 200 or the query analysis system 300. The user device 200 received one or more API search results 540 (e.g., application access mechanisms 202 (AAM) by querying one or more APIs 500 accessible via the user device 200 using the search query 332 and the additional information 340. The search system 400 generates one or more search system search results 440 using the search query 332, data included in the search data store 430, and, in some examples, the additional information 340. Specifically, the search module 410 identifies one or more application state records 450 included in the search data store 430 based on the search query 332 and, e.g., the additional information 340. The search module 410 transmits one or more application state IDs 452 that identify the application state records 450 to the search result generation module 420. The search result generation module 420 selects one or more access mechanisms 202 (AMs) (e.g., AAMs 202a, web access mechanisms (WAMs) 202b, and/or application download addresses 202c (ADAs)) from the identified application state records 450 and transmits the AMs 202 to the user device 200 as the search system search results 440 (e.g., with link data 444). In these examples, the query analysis system 300 may be part of the search system 400, part of another system or device, or a stand-alone system or device.

FIGS. 3B and 3C, illustrate various examples of the search module 410 in communication with the query analysis system 300 and a search data store 430. The search module 410 of FIG. 3B includes a query processing module 412, a set generation module 414, and a set processing module 416. As shown in FIG. 3B, the query processing module receives 412 the search query 332 (e.g., from the user device 200 or the query analysis system 300) and processes the search query 332 (e.g., performs any of tokenization, filtering, stemming, synonymization, and stop word removal with respect to the search query 332). The set generation module 414 then identifies one or more application state records 450 included in the search data store 430 using the (e.g., processed) search query 332 and, in some examples, the additional information 340 associated with the search query 332 received from the query analysis system 300. For example, the set generation module 414 may identify the application state records 450 using the search query 332 and, e.g., the additional information 340 (e.g., the domains indicated by the API selection data 342 and the corresponding probability values) as inputs to LUCENE® information retrieval software developed by the Apache Software Foundation. Specifically, the set generation module 414 may identify the application state records 450 based on matches between terms of the search query 332 and terms of application state information 454 (ASI) included in the application state records 450 and, in some examples, based on matches between the (e.g., most probable) domains indicated by the additional information 340 and domains associated with (e.g., indicated within) the application state records 450.

The identified application state records 450 may be referred to herein as a consideration set 415. The consideration set 415 of application state records 450 may refer to the application state records 450 that are to be scored by the set processing module 416. The set generation module 414 may determine the geo-location of the user device 200 based on data included in the search query wrapper 330. In additional examples, if the query analysis module 310 detects a query-specified location, the set generation module 414 uses the query-specified location as the search location. In some examples, the set generation module 414 uses the geo-location of the user device 200 as the search location (e.g., to filter application state records 450 based on location).

The set processing module 416 may score the consideration set 415 to generate one or more application state IDs 452 that identify the application state records 450 and transmits the application state IDs 452 to the search result generation module 420, as described above. The set processing module 416 may score the application state records 450 in the consideration set 415 in order to generate a set of search results 440. The scores 442 associated with the application state records 450 may be referred to as "result scores." The set processing module 416 may determine a result score 442 for each of the application state records 450 in the consideration set 415. The result scores 442 associated with an application state record 450 may indicate the relative rank of the application state record 450 (e.g., by the access mechanisms 202) among other application state records 450. For example, a larger result score 442 may indicate that an application state record 450 is more relevant to the received search query 332.

The set processing module 416 selects application access mechanisms 202 from the selected application state records 450 (e.g., the highest scoring application state records). The set processing module 416 transmits the selected application access mechanisms 202 to the user device 200 that generated the search query 332. The set processing module 416 may also transmit the result scores 442 associated with the selected application access mechanisms 202. For example, an application access mechanism 202 may be associated with the result score 442 of the application state record 450 from which the application access mechanism 202 was selected.

The search module 410 of FIG. 3C includes the query analysis system 300 and its components as part of the search module 410. As shown, the search module is in communication with the query analysis data store 320 and the search data store 430. In the example of FIG. 3C, the query analysis module 310 may perform any of the query processing techniques attributed to the query processing module 412 described with reference to FIG. 3B.

Figure 4B:
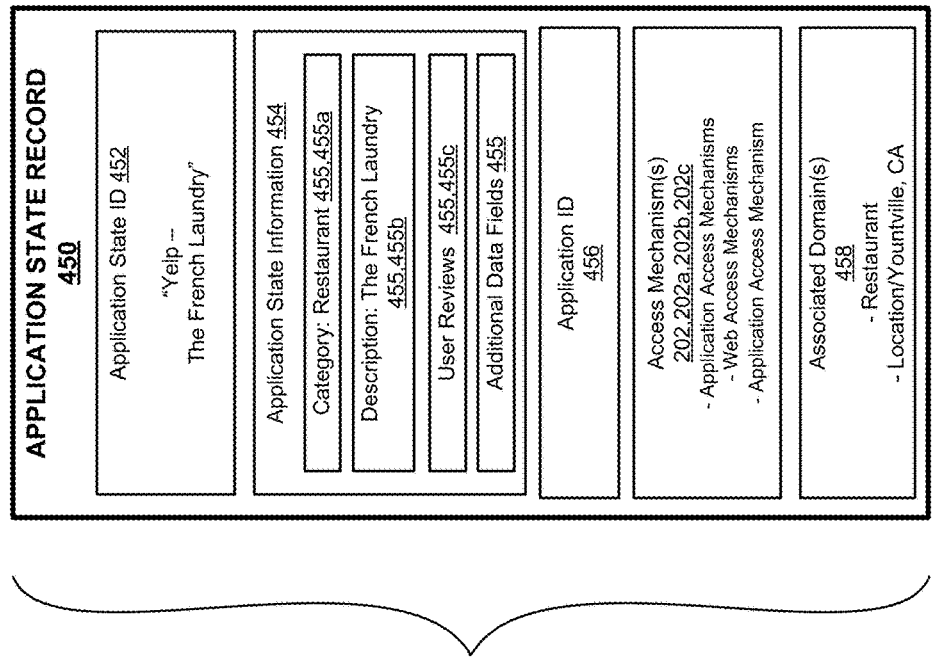
FIGS. 4A and 4B are schematic views of example application state records.
Figure 4A:
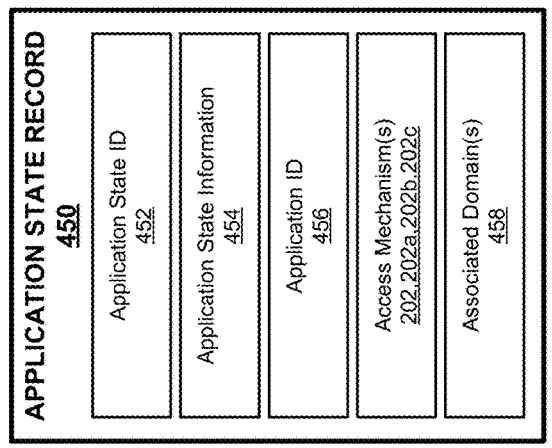

Referring to FIGS. 4A and 4B, the search data store 430 includes a plurality of different application state records 450. Each application state record 450 may include data related to a function of an application 204 and/or the state of the application 204 resulting from performance of the function. An application state record 450 may include an application state identifier (ID) 452, application state information 454, an application identifier (ID) 456, one or more access mechanisms 202, 202a, 202b, 202c used to access functionality provided by an application 204, and an associated domain(s) 458.

The application state ID 452 may be used to identify the application state record 450 among the other application state records 450 included in the search data store 430. The application state ID 452 may be a string of alphabetic, numeric, and/or symbolic characters (e.g., punctuation marks) that uniquely identifies the associated application state record 450. In some examples, the application state ID 452 describes a function and/or an application state in human readable form. For example, the application state ID 452 may include the name of the application 204 referenced in the access mechanism(s) 202. In a specific example, an application state ID 452 for an internet music player application may include the name of the internet music player application along with the song name that will be played when the internet music player application is set into the state defined by the application access mechanism 202 included in the application state record 450. Additionally or alternatively, the application state ID 452 may be a human readable string that describes a function performed according to the access mechanism(s) 202 and/or an application state resulting from performance of the function according to the access mechanism(s) 202. In some examples, the application state ID 452 includes a string in the format of a uniform resource locator (URL) of a web access mechanism 202*b* for the application state record 450, which may uniquely identify the application state record 450.

In a more specific example, and referring to FIG. 4B, if the application state record 450 describes a function of the YELP® native application, the application state ID 452 may include the name "Yelp" along with a description of the application state described in the application state information 454, For example, the application state ID 452 for an application state record 450 that describes the restaurant named "The French Laundry" may be "Yelp—The French Laundry." In an example where the application state ID 452 includes a string in the format of a URL, the application state ID 452 may include the following string "http://www.yelp.com/biz/the-french-laundry-yountville-2?ob=1" to uniquely identify the application state record 450. In additional examples, the application state ID 452 may include a URL using a namespace other than "http://," such as "func://," which may indicate that the URL is being used as an application state ID 452 in an application state record 450. For example, the application state ID 452 may include the following string "func://www.yelp.com/biz/the-french-laundry-yountville-2?ob=1."

The application state information 454 may include data that describes an application state into which an application 204 is set according to the access mechanism(s) 202 in the application state record 450. Additionally or alternatively, the application state information 454 may include data that describes the function performed according to the access mechanism(s) 202 included in the application state record 450. The application state information 454 can include text, numbers, and symbols that describe the application state. The types of data included in the application state information 454 may depend on the type of information associated with the application state and the functionality specified by the application access mechanism 202*a*. The application state information 454 may include a variety of different types of data, such as structured, semi-structured, and/or unstructured data. The application state information 454 may be automatically and/or manually generated based on documents retrieved from the data sources 130. Moreover, the application state information 454 may be updated so that up-to-date search results 440, 540 can be provided in response to a search query 332.

In some examples, the application state information 454 includes data that is presented to the user 10 by an application 204 when the application 204 is set in the application state defined by the access mechanism(s) 202. For example, if one of the access mechanism(s) 202 is an application access mechanism 202*a*, the application state information 454 may include data that describes a state of the native application 204*a* after the user device 200 has performed the one or more operations indicated in the application access mechanism 202*a*. For example, if the application state record 450 is associated with a shopping application, the application state information 454 may include data that describes products (e.g., names and prices) that are shown when the shopping application is set to the application state defined by the access mechanism(s) 202. As another example, if the application state record 450 is associated with a music player application, the application state information 454 may include data that describes a song (e.g., name and artist) that is played when the music player application is set to the application state defined by the access mechanism(s) 202.

The types of data included in the application state information 454 may depend on the type of information associated with the application state and the functionality defined by the access mechanism(s) 202. For example, if the application state record 450 is for an application 204 that provides reviews of restaurants, the application state information 454 may include information (e.g., text and numbers) related to a restaurant, such as a category of the restaurant, reviews of the restaurant, and a menu for the restaurant. In this example, the access mechanism(s) 202 may cause the application 204 (e.g., a native application 204*a* or a web-browser application 204*b*) to launch and retrieve information for the restaurant. As another example, if the application state record 450 is for an application 204 that plays music, the application state information 454 may include information related to a song, such as the name of the song, the artist, lyrics, and listener reviews. In this example, the access mechanism(s) 202 may cause the application 204 to launch and play the song described in the application state information 454.

The example application state information 454 includes data fields 455, such as a category 455*a* of THE FRENCH LAUNDRY® restaurant, a description 455*b* of THE FRENCH LAUNDRY® restaurant, user reviews 455*c* of THE FRENCH LAUNDRY® restaurant, and additional data fields 455. The restaurant category 455*a* field may include the text "French cuisine" and "contemporary," for example. The description field 455*b* may include text that describes THE FRENCH LAUNDRY® restaurant. The user reviews field 455*c* may include text of user reviews for THE FRENCH LAUNDRY® restaurant. The additional data fields 455 may include additional data for THE FRENCH LAUNDRY® restaurant that may not specifically fit within the other defined fields, such as a menu for the restaurant, prices, and operating hours for the restaurant.

The application state record 450 includes one or more access mechanism(s) 202. The access mechanism(s) 202 may include a reference to the YELP® application 204. An example application access mechanism 202*a* for the application state record 450 may include a reference to the YELP® native application 204*a* along with one or more operations to be performed by the user device 200. For example, the application access mechanism 202*a* may include an application resource identifier and/or one or more operations that cause the user device 200 to access the entry for THE FRENCH LAUNDRY® restaurant in the YELP® native application. An example application resource identifier may be "vnd.opentable.deeplink://opentable.com/restaurant/profile?rid=1180&refid=1."

In some implementations, an application state record 450 includes multiple different application access mechanisms 202, 202*a*, 202*b*, 202*c* that include a variety of information. The application access mechanism 202 may include edition information that indicates the application edition with which the application access mechanism 202 is compatible. For example, the edition information may indicate the operating system 224 with which the application access mechanism 202 is compatible. Moreover, different application access mechanisms 202 may be associated with different editions of a native application 204*a*. A native application edition (hereinafter "application edition") refers to a particular implementation or variation of a native application 204*a*. For example, an application edition may refer to a version of a native application 204*a*, such as a version 1.0 of a native application 204*a* or a version 2.0 of a native application 204*a*. In another example, an application edition may refer to an implementation of a native application 204*a* for a specific platform, such as a specific operating system 224.

The different application access mechanisms 202 included in an application state record 450 may cause the corresponding application editions to launch and perform similar functions. Accordingly, the different application access mechanisms 202 included in an application state record 450 may cause the corresponding application editions to be set into similar application states. For example, if the different application access mechanisms 202 reference different editions of an information retrieval application, the different application access mechanisms 202 may cause the corresponding application editions to retrieve similar information. In another example, if the different application access mechanisms 202 reference different editions of an intern& music player application, the different application access mechanisms 202 may cause the corresponding application editions to play the same song.

In some examples, an application state record 450 for a native application that retrieves restaurant information includes multiple different application access mechanisms 202 for multiple different application editions. Assuming the application state record 450 is associated with a specific Mexican restaurant, the application access mechanisms 202 for the different application editions may cause each application edition to retrieve information for the same specific Mexican restaurant. For example, a first application access mechanism 202 may cause a first application edition (e.g., on a first OS) to retrieve information for the specific Mexican restaurant. A second application access mechanism 202 may cause a second application edition (e.g., on a second OS) to retrieve information for the specific Mexican restaurant. In some examples, the search system 400 can determine whether to transmit the application access mechanism 202 in the search results 440, 540 based on whether the user device 200 can handle the application access mechanism 202.

The application state record 450 may also include one or more associated domains 458 that are associated with the application state (e.g., types of business, product, service, or location that describe the state and/or a function performed by the state). The query analysis system 300 and/or the search system 400 may use the associated domains 458 to identify the application state record 450 using one or more domains 458 indicated by additional information 340 associated with a search query 332. In some examples, the domains 458 indicated by the application state record 450 are included as part of the application state information 454 or separate from the applications state information as shown in FIGS. 4A and 4B. As shown in FIG. 4B, one or more domains 458 (e.g., restaurant, location) are associated with the application state record 450 of the function of the YELP® native application describing THE FRENCH LAUNDRY® restaurant are used to identify the application state record 450. Other domains may also be used.

The query analysis system 300 and/or the search system 400 may generate application state information 454 included in an application state record 450 in a variety of different ways. In some examples, the query analysis system 300 and/or the search system 400 retrieves data to be included in the application state information 454 via partnerships with database owners and developers of native applications 204a. For example, the search system 400 may automatically retrieve the data from online databases 130f that include, but are not limited to, data related to movies, television programs, music, and restaurants. In some examples, a human operator manually generates some data included in the application state information 454. The query analysis system 300 and/or the search system 400 may update data included in the application state information 454 over time so that the query analysis system 300 and/or the search system 400 provides up-to-date results 440, 540.

The application ID 456 may be used to identify a native application 204a associated with the application state record 450. The application ID 456 may be a string of alphabetic, numeric, and/or symbolic characters (e.g., punctuation marks) that uniquely identifies the associated native application 204a. In some examples, the application ID 456 the native application 204a in human readable form. For example, the application ID 456 may include the name of the application 204 referenced in the access mechanism(s) 202. In a specific example, the application ID 456 for a restaurant finder application 204 may include the name of the restaurant finder application.

An application state record 450 including an application access mechanism 202 that causes an application 204 to launch into a default state may include application state information 454 describing the native application 204a, instead of any particular application state. For example, the application state information 454 may include the name of the developer of the application 204, the publisher of the application 204, a category 455a (e.g., genre) of the application 204, a description 455b of the application 204 (e.g., a developer's description), and the price of the application 204. The application state information 454 may also include security or privacy data about the application 204, battery usage of the application 204, and bandwidth usage of the application 204. The application state information 454 may also include application statistics. Application statistics may refer to numerical data related to a native application 204a. For example, application statistics may include, but are not limited to, a number of downloads, a download rate (e.g., downloads per month), a number of ratings, and a number of reviews.

Figure 5:
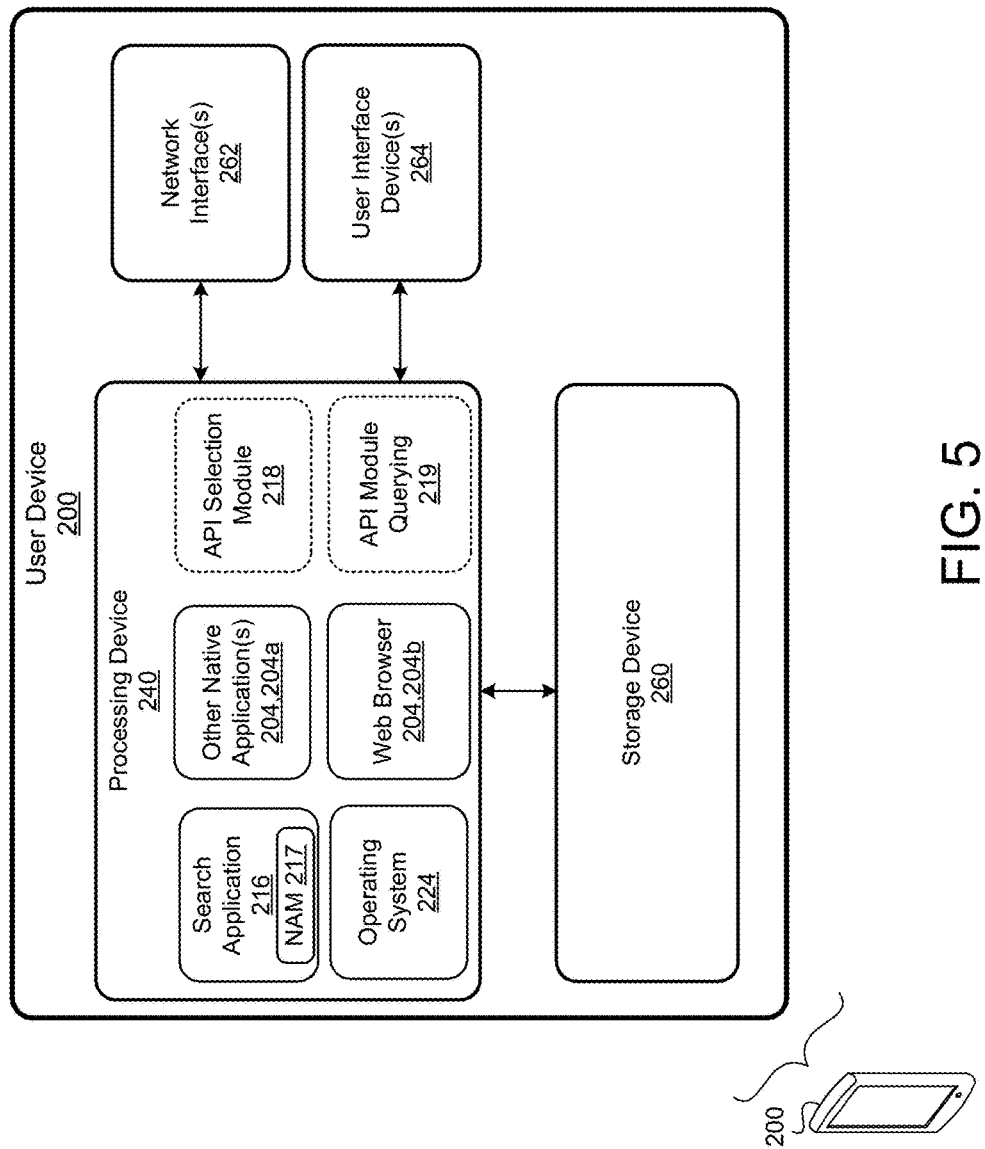
FIG. 5 is a schematic view of an example user device.

FIG. 5 illustrates example components of a user device 200. In the illustrated example, the user device 200 includes a processing device 240, a storage device 260, a network interface device 262, and a user interface device 264. The user device 200 may include other components not explicitly depicted.

The processing device 240 includes memory (e.g., RAM and/or ROM) that stores computer readable instructions and one or more processors that execute the computer readable instructions. In implementations where the processing device 240 includes two or more processors, the processors can execute in a distributed or individual manner. The processing device 240 may execute a native application 204a that includes a native application module, any number of other native applications 204a, a web browser 204b, and an operating system 224, all of which may be embodied as computer readable instructions. The operating system 224 acts as an interface between the processing device 240 and the applications 204.

The storage device 260 includes one or more computer readable mediums (e.g., hard disk drive and/or flash memory). The storage device 2560 can store the computer readable instructions that make up the native applications 204a, the web browser 204b, and the operating system 224. The network interface 262 includes one or more devices that are configured to communicate with the network. The network interface 262 can include one or more transceivers for performing wired or wireless communication. Examples of the network interface 262 may include, but are not limited to, a transceiver configured to perform communications using the IEEE 802.11 wireless standard, an Ethernet port, a wireless transmitter, and a universal serial bus (USB) port. The user interface 264 includes one or more devices that receive input from and/or provide output to a user 10. The user interface 264 can include, but is not limited to, a touchscreen, a display, a QWERTY keyboard, a numeric keypad, a touchpad, a microphone, and/or speakers.

The processing device 240 executes a native search application 216 configured with a native application module 217. The native application module 217 is a set of computer readable instructions embedded (e.g., by the developer) in the native application 204a, i.e., search application 216. In some implementations, the developers utilize a software developer kit (SDK) provided by the provider of the query analysis system 300 and/or the search system 400 to implement the native application module 217. When the user 10 accesses a state of the search application that calls the native application module 217, the native application module 217 generates a query wrapper 330 based on the state of the native application that is currently being accessed (referred to as the "accessed state"). An example query wrapper 330 may define a state of the search application 216 and can further define additional parameters that may be used by the query analysis system 300 and/or the search system 400 to execute the searches. The native application module 217 may further request a geolocation of the user device 200 from the operating system 224 of the user device 200, which the native application module 217 includes in the query wrapper 330. Further, in some implementations, the native application module 217 includes user information (which the user 10 has agreed to share, such as age, gender, and/or preferences) in the query wrapper 330. The native application module 217 transmits the query wrapper 330 to the query analysis system 300 and/or the search system 400.

In some examples, the processing device 240 also includes an API selection module 218 and an API querying module 219. The API selection module 218 determines one or more API(s) 500 that will receive the API query wrapper 530, while the API querying module 219 sends the API query wrapper 530 to the specific selected one or more API(s) 500. In some examples, the API querying module 219 determines the information that an API 500 needs to execute a search and includes the information in the API query wrapper 530.

Figure 6A:
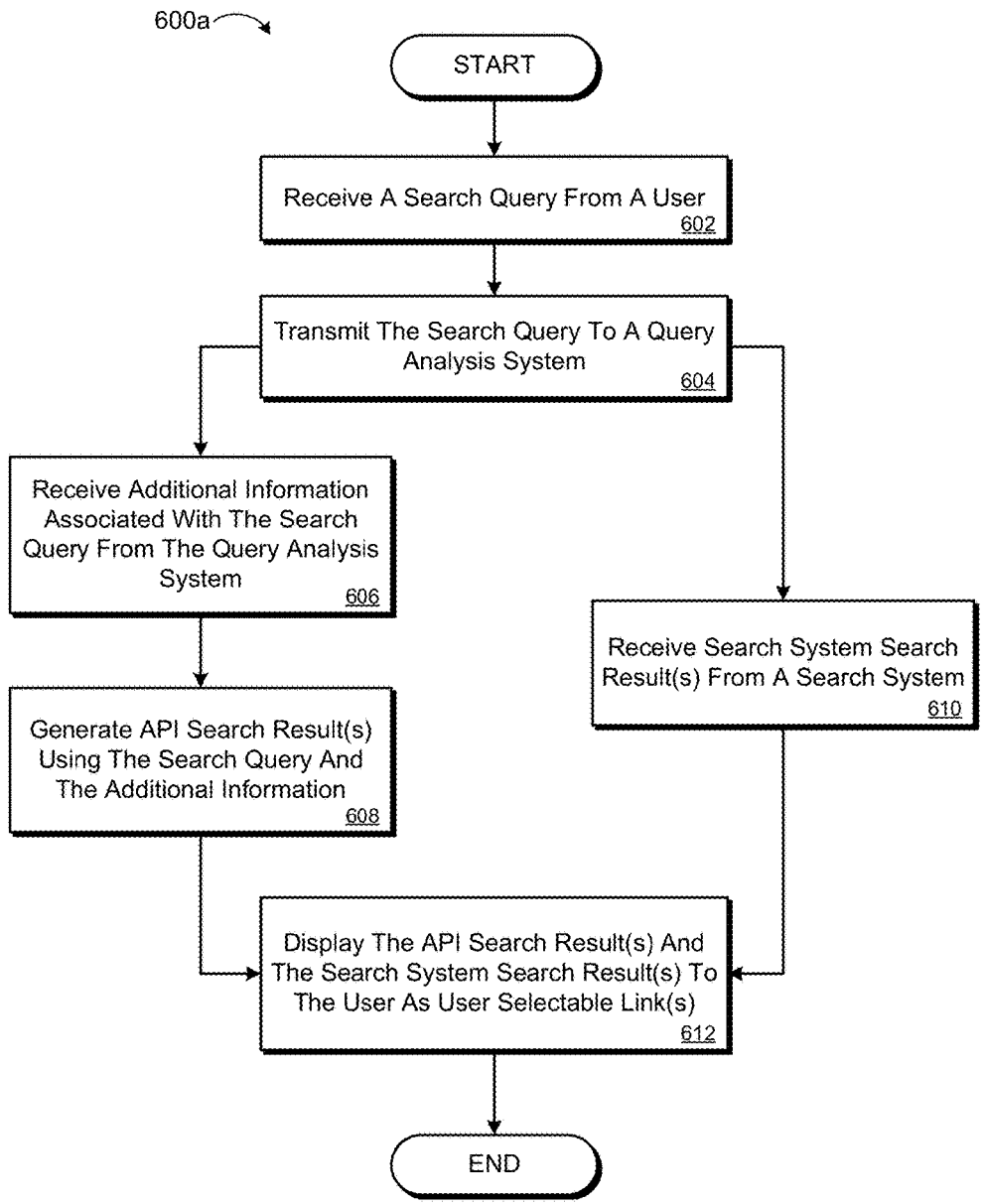
FIG. 6A is a schematic view of an example arrangement of operations for a method of generating search results at a user device using the search query.

FIG. 6A provides an example arrangement of operations for a method 600a of generating search results at a user device 200 using the search query 332. The method 600a is described with respect to the user device 200, the query analysis system 300, and the search system 400 as illustrated in FIGS. 1A-2D. In block 602, the user device 200 receives a search query 332 from a user 10 of the user device 200. At block 604, the user device 200 then transmits the search query 332 to a query analysis system 300 (e.g., as part of a query wrapper 330). The user device 200 may also transmit other information to the query analysis system 300 (e.g., also as part of the query wrapper 330), such as user information and/or geo-location data 334, platform data 336, and IP address information 338 associated with the user device 200. In some examples, the query analysis system 300 is part of a search system 400. In other examples, the query analysis system 300 may be part of another system or device (e.g., part of a local network gateway, a cellular network tower, or a remote server), or a stand-alone system or device. As described herein, the query analysis system 300 analyzes the search query 332 to generate additional information 340 associated with the search query 332. As also described herein, the additional information 340 may include one or more of an API selection data 342, API querying data 344, and search result display data 346, previously described with respect to FIG. 2A. The query analysis system 300 then transmits the additional information 340 to the user device 200 and, in some examples, to the search system 400. For instance, in examples where the query analysis system 300 is part of the search system 400, the additional information 340 may be readily available (e.g., forwarded by the query analysis system 300) to the search system 400. In these examples, the search query 332 may also be available (e.g., forwarded by the query analysis system 300) to the search system 400, e.g., along with the other information associated with the user 10 and/or the user device 200. In other examples, the search system 400 may receive the search query 332 from the user device 200 (see FIGS. 2A-2C).

At block 606, the user device 200 receives the additional information 340 from the query analysis system 300, and at block 608, the user device 200 generates one or more API search results 540 including one or more access mechanism 202 (e.g., application access mechanism) based on the search query 332 and the additional information 340 (e.g., the API selection data 342 and the API querying data 344). In parallel, the search system 400 also receives the search query 332 and, in some examples, the additional information 340 from one or more of the user device 200 and the query analysis system 300. The search system 400 then generates one or more search system search results 440 including one or more application access mechanisms 202a, web access mechanism 202b, and/or download mechanism 202c, using the search query 332 and the additional information 340. The search system 400 transmits the search system search results 440 to the user device 200. At block 610, the user device 200 receives the search system search results 440 from the search system 400 and displays the API 500 and search system search results 440 to the user 10 as one or more user selectable links 250. In some examples, at block 612, the user device 200 displays the API search results 540 and search system search results 440 using the additional information 340 (e.g., the search result display data 346 and link data 444, 544). Each user selectable link 250 includes one of the access mechanisms 202 included in the API 500 and search system search results 440, 540 and, e.g., link data 444, 544 also received as part of the search results 440, 540.

Figure 6B:
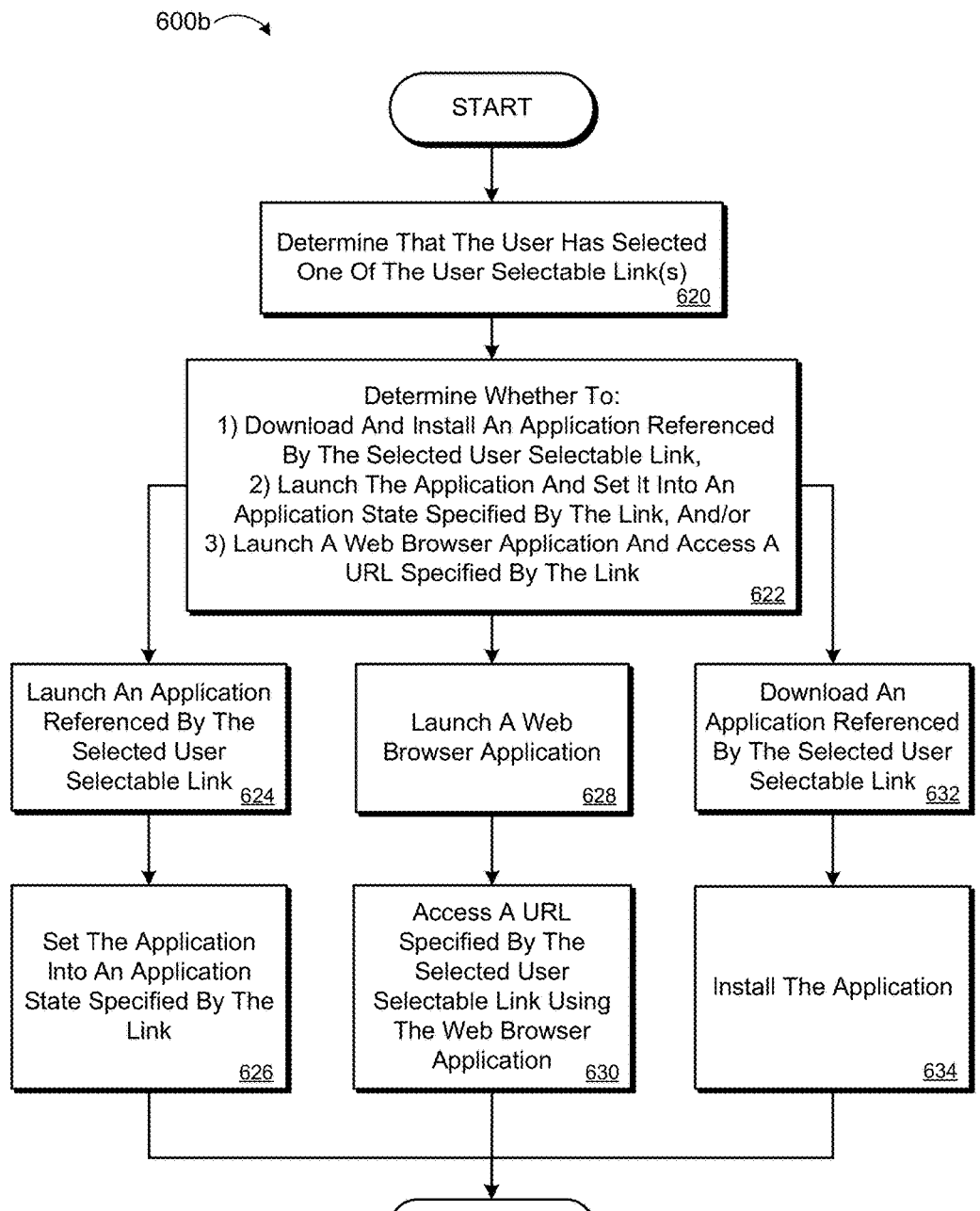
FIG. 6B is a schematic view of an example arrangement of operations for a method of a user selecting a user selectable link of a graphical user interface displaying search results.

FIG. 6B provides an example arrangement of operations for a method 600b of a user 10 selecting a user selectable link 250 of a GUI 230 displaying search results 440, 540. The method 600b is described with respect to the user device 200, the query analysis system 300, and the search system 400 as illustrated in FIGS. 1A-2D. The user 10 may select any of the user selectable links 250. Upon a user selection of a user selectable link 250, at block 620, the user device 200 determines that the user 10 has selected one of the user selectable links 250 associated with a search result 440, 450. At block 622, the user device 200 determines which selection to make between blocks 624, 628, and 632. In some examples, at block 624, the user device 200 launches an application referenced by the selected link 250 (e.g., by an application access mechanism 202 included in the link 250), and at block 626, the user device 200 sets the application 204 into an application state specified by the link 250 (e.g., according to the application access mechanism 202). In other examples, at block 632 the user device 200 may download and at block 634 install the application 204 referenced by the selected link 250 (e.g., from a digital distribution platform using an application download mechanism included in the link 250 (see download button 209b)), upon which the user device 200 may launch the application 204 and set it into an application state specified by the link 250 (e.g., according to an application access mechanism 202 also included in the link 250), in a similar manner as described above. In still other examples, at block 628 the user device 200 may launch a web browser application 202b, and at block 630 the user device 200 may access a URL specified by the selected link 250 (e.g., access a state of a web based application using a web access mechanism 202b included in the link 250).

FIGS. 7A-8B provide an example arrangement of operations for methods 700a, 700b, 800a, 800b of generating the API search results 540 and displaying the API and search system search results 440, 540 at the user device 200 using the additional information 340 associated with the search query 332. The methods 700a, 700b, 800a, 800b are described with respect to the user device 200, the query analysis system 300, and the search system 400 as illustrated in FIGS. 1A-2D.

Figure 7A:
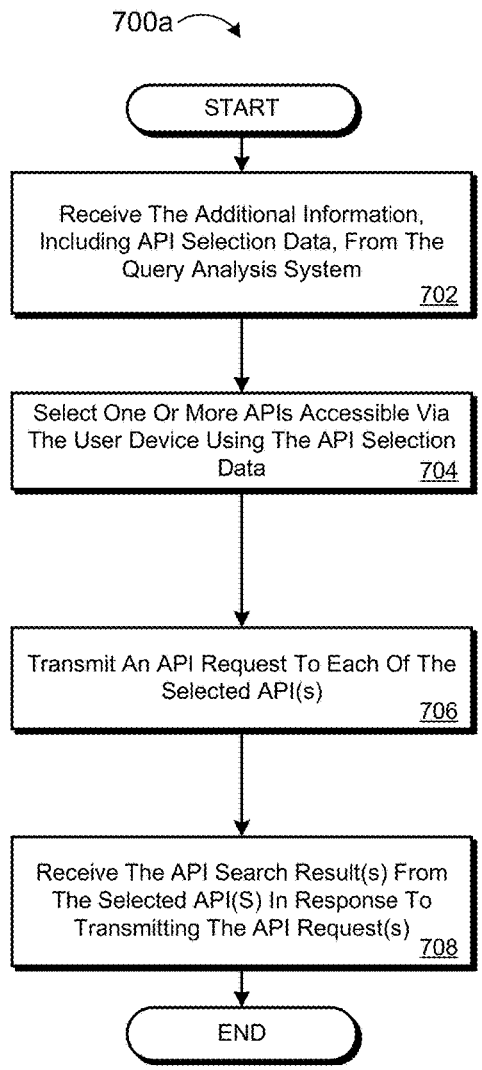
FIGS. 7A-8B are schematic views of example arrangements of operations for methods of generating search results and displaying the search results at a user device.
Figure 7B:
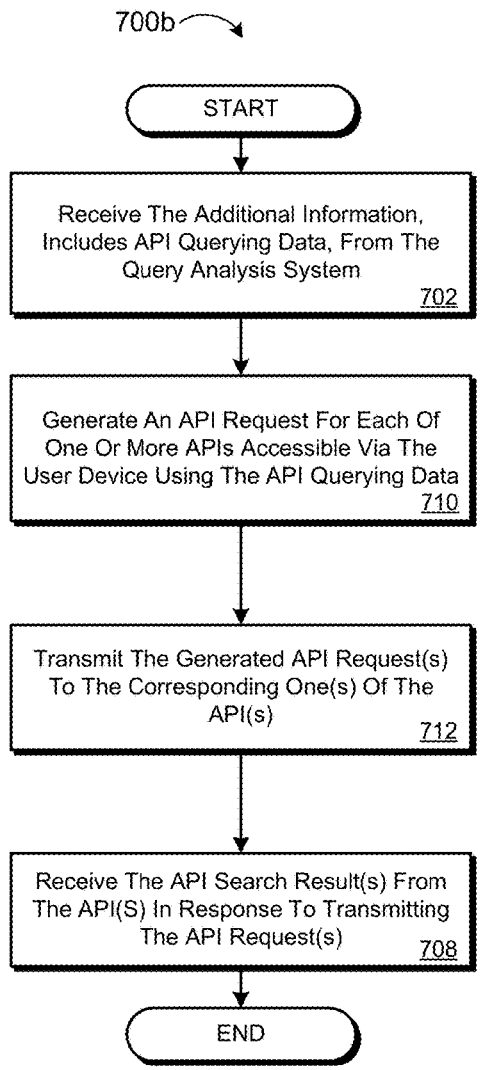

As shown in FIGS. 7A and 7B, at block 702, the user device 200 receives the additional information 340 from the query analysis system 300. The additional information 340 includes API selection data 342 configured to enable the user device 200 to select one or more of the APIs 500 accessible via the user device 200 for querying the APIs 500 using the search query 332. Specifically, at block 704, the user device 200 may select the APIs 500 using one or more domains indicated by the API selection data 342 (e.g., by mapping the domains to the selected APIs 500 using a look-up table (LUT) or another mapping). In some examples, the user device 200 selects one or more of the APIs 500 that match the domains having the highest probability values. The user device 200 may then transmit, at block 706, an API request 532 generated using the search query 332 and the additional information 340 (e.g., the API querying data 344) to each of the selected APIs 500. At block 708, the user device 200 receives the API search results 540 from the APIs 500 in response to transmitting the API requests 532.

As shown in FIG. 7B, the additional information 340 includes API querying data 344 configured to enable the user device 200 to query one or more of the APIs 500 accessible via the user device 200 (e.g., the selected APIs 500) using the search query 332. The API querying data 344 may include one or more API requests 532, or instructions for generating the API requests 532 for querying the APIs 500. In some examples, the API querying data 344 corresponds to, or instructs the generation of a version of the search query 332 that has been corrected for spelling. Additionally, or alternatively, the API querying data 344 may correspond to, or instruct the generation of a general rewrite of the search query 332 based on entity and/or location matching or other data. In addition to, or instead of, the spelling correction and general rewrite features described above, the API querying data 344 may correspond to, or instruct the generation of an API-specific rewrite of the search query 332 for one or more particular APIs 500 (e.g., those accessible via the user device 200). For instance, the API querying data 344 may include a set of rules that specify how the user device 200 may query one or more APIs 500 (e.g., by parameterizing the search query 332, or taking into account the specific/unique fields provided by each API 500 and its query interface, resulting in a so-called "structured search"). Alternatively, the API querying data 344 may already include a parameterized search query 332 for each of one or more of the APIs 500. In one example, API querying data 344 generated by the query analysis system 300 for the search query 332 "Starbucks" and the native application YELP® may include, or instruct the generation of an API request 532 including the strings "Yelp:Cat=Coffee_shop" and "text=SBKS Inc." In this example, the API querying data 344 indicates that, for the API 500 associated with YELP®, the "query" field of the API query interface should include the string "SBKS Inc.," and that the category of the API query interface should be set as "Coffee_shop." At block 710, the user device 200 may generate an API request 532 for each of one or more of the APIs 500 accessible via the user device 200 (e.g., the selected APIs 500) using the API querying data 344. At block 712, the user device 200 transmits the API requests 532 to the corresponding ones of the APIs 500, and receives the API search results 540 from the queried APIs 500 in response to transmitting the API requests 532.

Figure 8A:
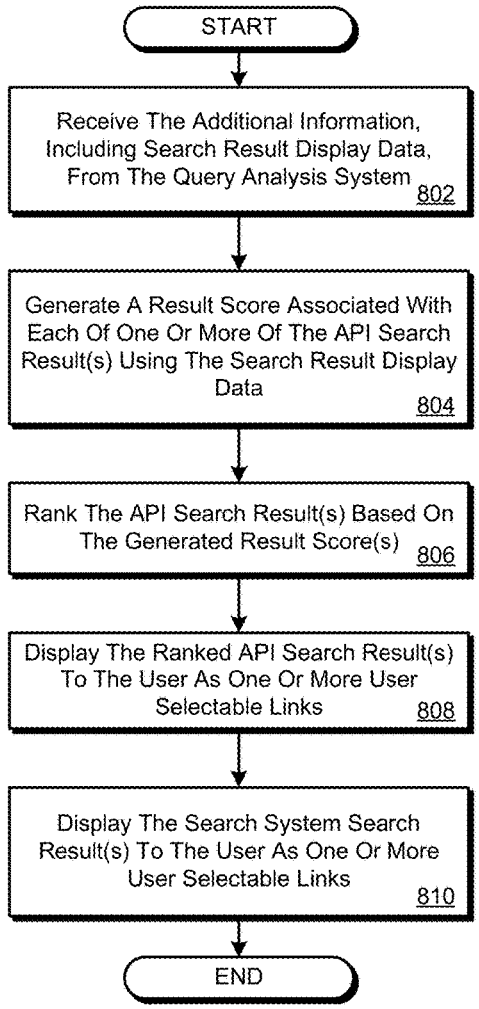
Figure 8B:
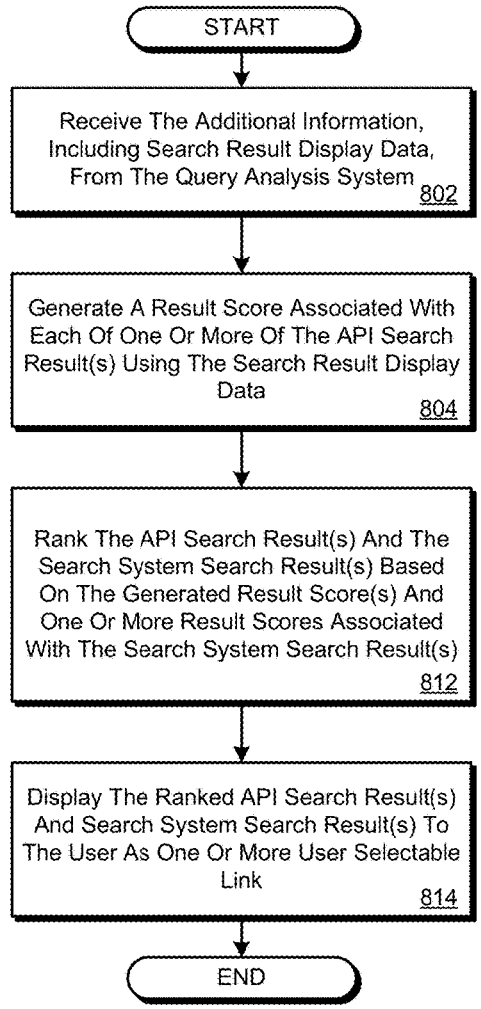

Referring to FIGS. 8A and 8B, in some implementations, a method 800a, 800b includes receiving, at block 802, additional information that includes search result display data 346 configured to enable the user device 200 to display (e.g., score, rank, and/or combine) the API search results 540 and search system search results 440 to the user 10 as the user selectable links 250. In some examples, the search result display data 346 includes the probability values associated with the domains indicated by the API selection data 342. At block 804, the method 800a, 800b includes using the probability values (and, e.g., other data received from the queried APIs 500, such as application-specific popularity or ratings data associated with the API search results 540) to generate result scores 542 for the API search results 540. At block 806, the method 800a, 800b may include using the result scores 542 to rank the API search results 540 as part of displaying them to the user 10 as user selectable links 250. For example, an API search result 540 generated by querying an API 500 selected using a domain having a higher probability value may be scored/ranked higher than an API search result 540 generated by querying an API 500 selected using a domain having a lower probability value. In a specific example, API search results 540 received from a hotel application API may score/rank higher than API search results 540 received from a movie application API. In this example, the query analysis system 300 may have determined that the search query 332 more likely intends a search for hotels than movies (i.e., the additional information 340 includes a domain "hotel" used to select the hotel application API and having a higher probability value, and a domain "movie" used to select the movie application API and having a lower probability value). At block 806, the method 800a, 800b includes using the result scores 542 to rank the API search results 540 among one another, as shown in FIG. 8A, or to rank the API search results 540 along with the search system search results 440, as shown in FIG. 8B (block 812). The search system search results 440 may also be associated with result scores 442, as described herein. In other examples, the search result display data 346 may directly indicate how the user device 200 should display the API 500 and search system search results 440, 450. In any case, using the search result display data 346, at blocks 808, 810 and 814, the method 800a, 800b may include displaying the API 500 and search system search results 440 to the user 10 as the user selectable links 250.

Figure 9:
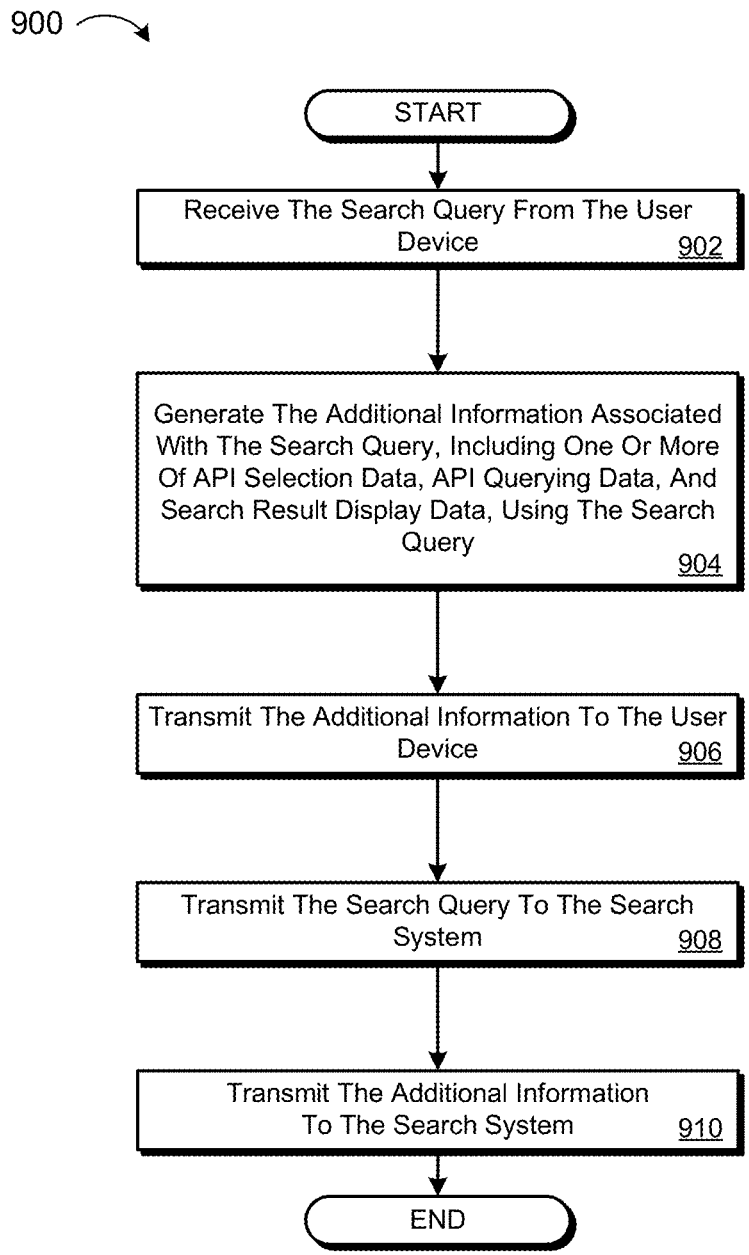
FIG. 9 provides an example arrangement of operations for a method of generating additional information associated with a search query using a query analysis system.

FIG. 9 provides an example arrangement of operations for a method 900 for generating the additional information 340 associated with the search query 332 using the query analysis system 300. The method 900 is described with respect to the user device 200, the query analysis system 300, and the search system 400 as illustrated in FIGS. 1A-2D.

At block 902, the query analysis system 300 receives the search query 332 from the user device 200. At block 904, the query analysis system 300 generates the additional information 340 associated with the search query 332. In some examples, the query analysis system 300 generates the additional information 340 such that it includes API selection data 342. The API selection data 342 indicates to the user device 200 which of one or more APIs 500 accessible via the user device 200 (e.g., corresponding to one or more applications 204a installed on the user device 200) should be queried using the search query 332 (e.g., the API requests 532). In some examples, the query analysis system 300 generates the additional information 340 such that it includes API querying data 344. The API querying data 344 may enable the user device 200 to query one or more APIs 500 accessible via the user device 200 using the search query 332 (e.g., the API querying data 344 includes, or instructs the generation of, the API requests 532). As still another example, the query analysis system 300 may generate the additional information 340 such that it includes search result display data 346. The search result display data 346 may indicate to the user device 200 how to display the API 500 and, e.g., the search system search results 440 to the user 10. In some examples, the additional information 340 includes one or more of (e.g., any combination of) the API selection data 342, the API querying data, and the search result display data 346 described above. At block 906, the query analysis system 300 transmits the additional information 340 to the user device 200. In some examples, the query analysis system 300 also transmits (e.g., forward) the search query 332 (block 908) and the additional information 340 (block 910) to the search system 400.

Figure 10:
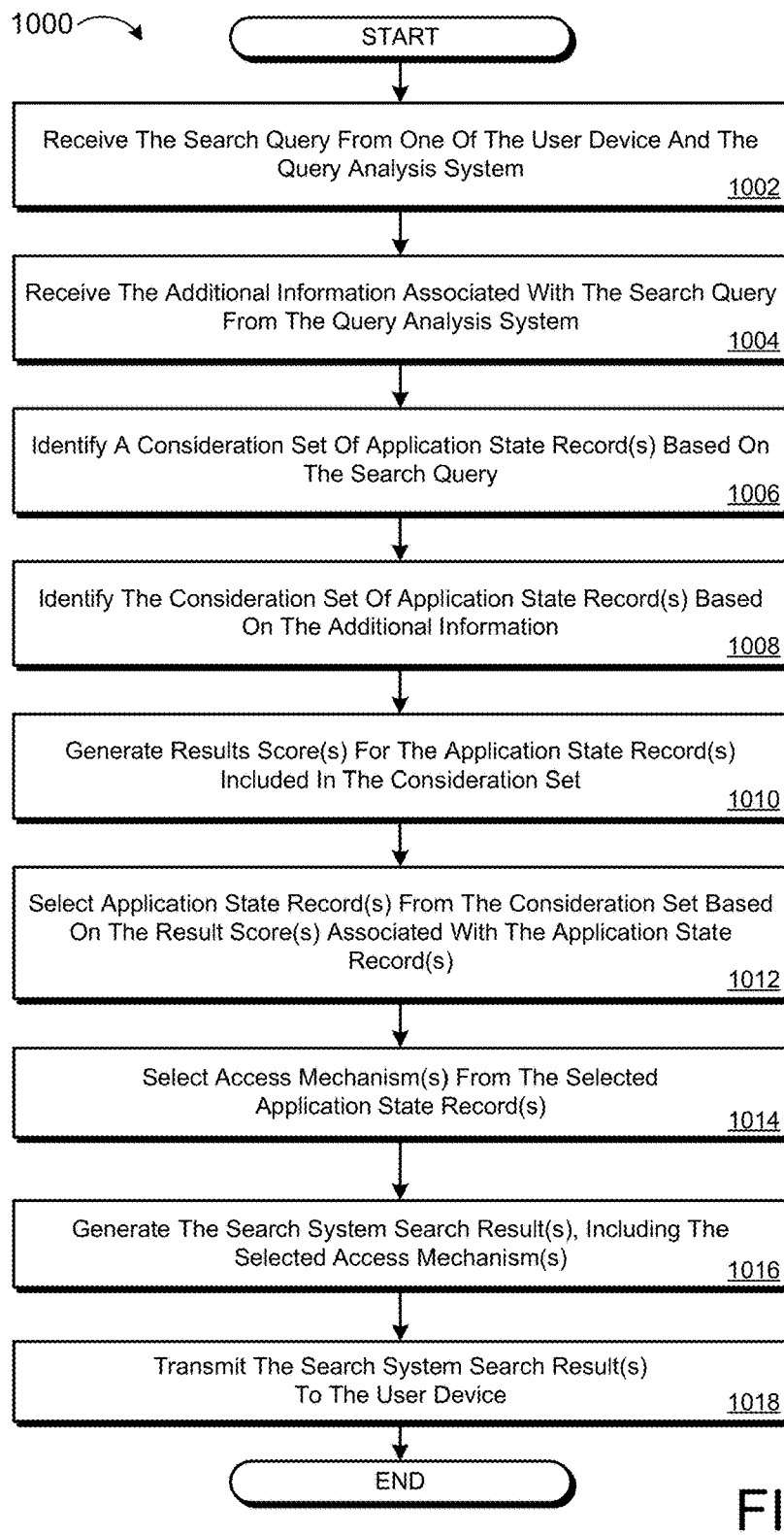
FIG. 10 is an example arrangement of operations for a method of generating search results at a search system using a search query.

FIG. 10 provides an example arrangement of operations for a method 1000 for generating search results 440 at a search system 400 using a search query 332 and, optionally, additional information 340 associated with the search query 332. The method 900 is described with respect to the user device 200, the query analysis system 300, and the search system 400 as illustrated in FIGS. 1A-2D.

At block 1002, the search system 400 receives the search query 332 from one of the user device 200 and the query analysis system 300. In some examples, at block 1004, the search system 400 further receives the additional information 340 from the query analysis system 300. The search system 400 generates the search system search results 440 using the search query 332 and, in some examples, the additional information 340. At block 1006, the search system 400 may first identify a consideration set 415 of one or more application state records 450 included in the records data store 430 based on the search query 332. Optionally, at block 1008, the system 400 may also consider the additional information 340 when identifying the consideration set 415. In some examples, the search system 400 further processes the identified application state records 450 of the consideration set 415 (e.g., at block 1010, generate a result score 442 for each record 450, rank the records 450 using the result scores 442, and at block 1012, select one or more highest ranking records 450 from the consideration set 415). At block 1014, the search system 400 selects one or more access mechanisms 202 from the identified records 450. At block 1016, the search system 400 generates the search system search results 440 including the selected access mechanism 202. At block 1018, the search system 400 transmits the selected access mechanism 202 to the user device 200 as the search system search results 440.

FIG. 11A provides an example arrangement of operations for a method 1100 for displaying search results 440, 540 on a display 201 of a user device 200 based on a search query 332 inputted via the display 201 by the user 10. The method 1100 is described with respect to the user device 200, the query analysis system 300, and the search system 400 as illustrated in FIG. 11B.

At block 1102, data processing hardware 800 receives a first search query 332 (e.g., included in a query wrapper 330) from a user device 200 in communication with the data processing hardware 800. At block 1104, the data processing hardware 800 transmits the first search query 332 from the data processing hardware 800 to a query analysis system 300 and a first search system 400 (e.g., the search system 400). At block 1106, the data processing hardware 800 receives first search results 440 from the first search system 400. At block 1108, the data processing hardware 800 receives query information or additional information 340 based on the first search query 332 from the query analysis system 300. The query information or additional information 340 includes API 500 information for an API 500 of a second search system 400.

At block 1110, the data processing hardware 800 transmits a second search query 530 to the API 500 of the second search system 400. The second search query 530 is based on the information or additional information 340. At block 1112, the data processing hardware 800 receives second search results 540 from the second search system 400. At block 1114, the data processing hardware 800 sends a result set 440, 540 to the user device 200. The result set 440, 540 includes at least some of the first search results 440 and the second search results 540 for display on the user device 200. The at least one search result 440, 540 includes an application access mechanism 202 that has a reference to a corresponding installed application 204a on the user device 200 and indicates a performable operation for the corresponding installed application 204a.

In some implementations, the data processing hardware 800 identifies the second search system 400 among a collection of search systems 400 based on the query information 340 and/or the first search query 330, 332. The data processing hardware 800 may determine the second search query 540 for the second search system 400 based on the query information 340 and the first search query 330, 332. The application access mechanism 202 may be configured to launch the corresponding installed application 204a on the user device 200 and set the installed application 204 to an application state specified by the application access mechanism 202.

The query information 340 may include search result display data 346. The data processing hardware 800 may generate a result score 442, 542 for each of the first search results 440 and/or each of the second search results 540 using the search result display data 346. Additionally, the data processing hardware 800 may rank the first search results 440 and/or each of the second search results 540 based on the corresponding result scores 442, 542.

Figure 12:
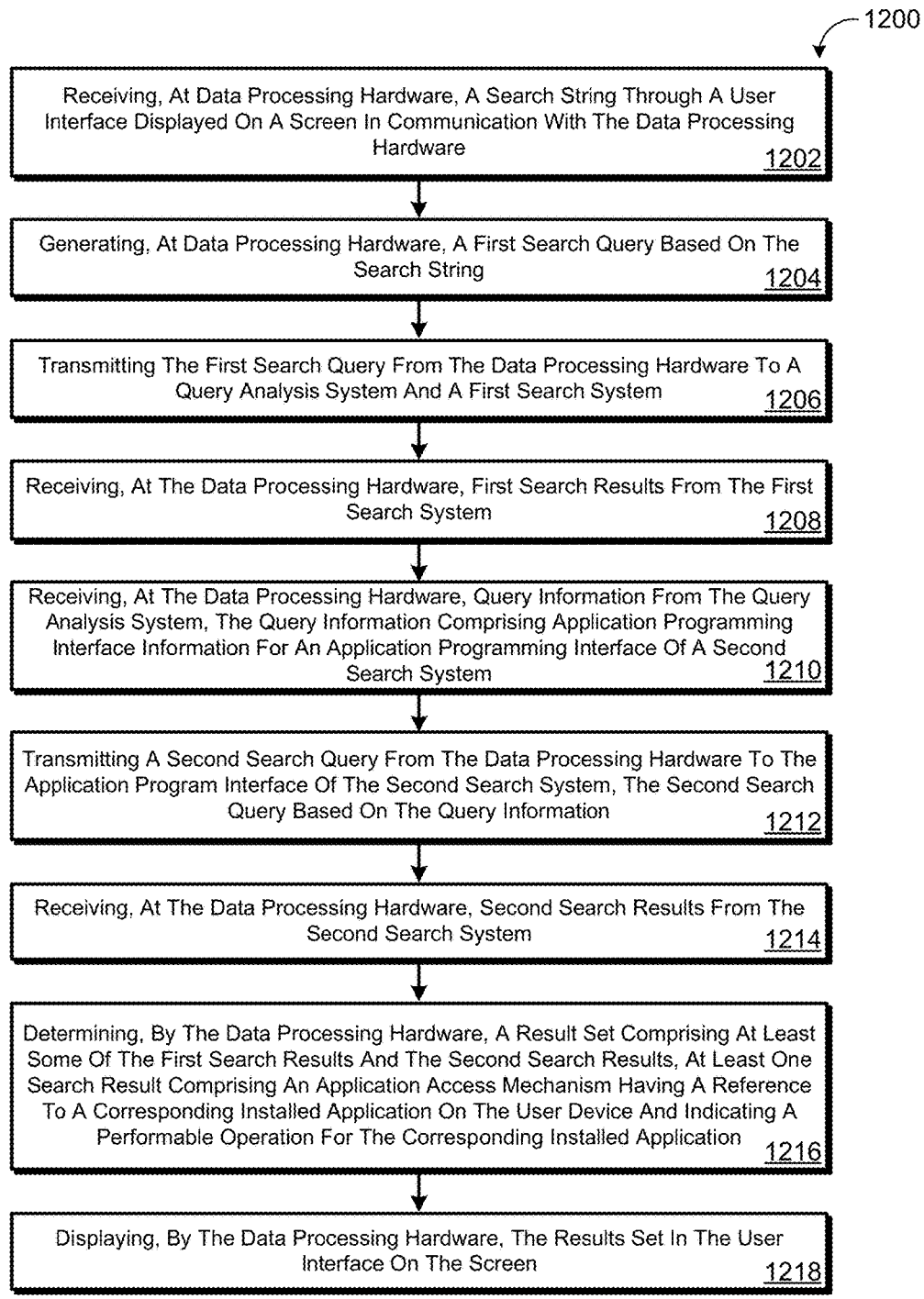
FIG. 12 is an example arrangement of operations for a method for displaying search results on a display of a user device.

FIG. 12 provides an example arrangement of operations for a method 1200 for displaying search results 440, 540 on a display 201 of a user device 200 based on a search query 332 inputted via the display 201 by the user 10. The method 1200 is described with respect to the user device 200, the query analysis system 300, and the search system 400 as illustrated in FIGS. 1A-2D.

At block 1202, the user device 200 (e.g., data processing hardware 800) receives a search string (e.g., search query 332) through a user interface 230 displayed on a screen 201 in communication with the data processing hardware 800. At block 1204, the user device 200 generates a first search query 332 based on the search string and transmits, at block 1206, the first search query 332 (included in a query wrapper 320) to a query analysis system 300 and a first search system 400 (the search system 400). At block 1208, the user device 200 receives first search results 440 from the first search system 440 and at block 1210, the user device 200 receives query information or additional information 340 from the query analysis system 300. The query information 340 includes application programming interface information for an application programming interface of a second search system 400. At block 1212, the user device 200 transmits a second search query 530 to the API 500 of the second search system 400. The second search query 530 is based on the query information 340. At block 1214, the user device 200 receives second search results 540 from the second search system 400. At block 1216, the user device 200 determines a result set 440, 540 that includes at least some of the first search results 440 and the second search results 540. At least one search result 440, 540 includes an application access mechanism 202 that has a reference to a corresponding installed application 204a on the user device 200 and indicates a performable operation for the corresponding installed application 204a. At block 1218, the user device 200 displays the results set 440, 450 in the user interface 230 on the screen 201.

In some implementations, the user device 200 identifies the second search system 400 among a collection of search systems 400 based on the query information 340 and/or the first search query 332. Additionally, the user device 200 may determine the second search query 530 for the second search system 400 based on the query information 340 and the first search query 332.

In some examples, the user device 200 displays each search result 440, 540 of the results set 440, 540 in the user interface 254 as a user selectable link 250. Each search result 440, 540 has an associated application access mechanism 202 associated with the corresponding user selectable link 250. The user device 200 may receive a user selection of one of the user selectable links 250, and execute, at the data processing hardware 800, the application access mechanism 202 associated with the selected user selectable link 250. The executed application access mechanism 202 may be associated with the selected user selectable link 250, which launches the corresponding installed application on the user device 200 and sets the installed application 204a to an application state specified by the application access mechanism 202.

The query information 340 may include search result display data 346. In some implementations, the user device 200 generates a result score 442, 542 for each of the first search results 440 and/or each of the second search results 540 using the search result display data 346. The user device 200 may rank the first search results 440 and/or the second search results 540 based on the corresponding result scores 442, 542. In some examples, the user device 200 displays the search results 440, 540 of the result set 440, 540 in the user interface 230 in an order based on the corresponding result scores 442, 542.

Figure 13:
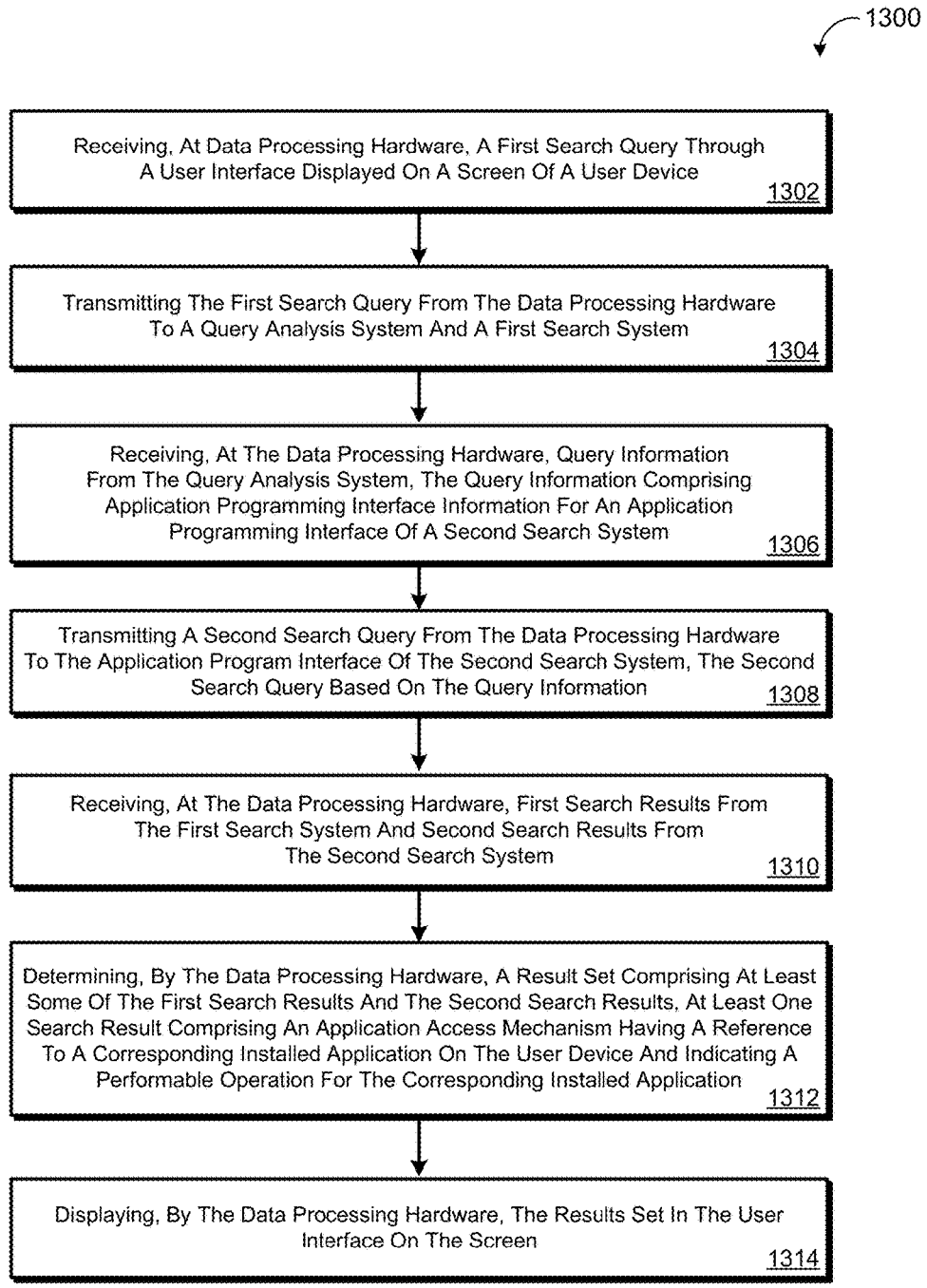
FIG. 13 is an example arrangement of operations for a method for displaying search results on a display of a user device.

FIG. 13 provides an example arrangement of operations for a method 1300 for displaying search results 440, 540 on a display 201 of a user device 200 based on a search query 332 inputted via the display 201 by the user 10. The method 1300 is described with respect to the user device 200, the query analysis system 300, and the search system 400 as illustrated in FIGS. 1A-2D.

At block 1302, the method 1300 includes receiving at data processing hardware (e.g., user device 200, data processing hardware 800) a first search query 332 through a user interface 230 displayed on a screen 201 of a user device 200. At block 1304, the method 1300 includes transmitting the first search query 332 from the data processing hardware to a query analysis system 300 and a first search system 400.

At block 1306, the method 1300 further includes receiving query information 340 from the query analysis system 300. The query information 340 includes application programming interface information 342 for an application programming interface of a second search system 500. At block 1308, the method 1300 includes transmitting a second search query 532 from the data processing hardware to the application program interface 500a-n of the second search system 500, where the second search query 532 is based on the query information 340. At block 1310, the method 1300 additionally includes receiving, at the data processing hardware, first search results 440 from the first search system 400 and second search results 540 from the second search system 500. At block 1312, the method 1300 includes determining, by the data processing hardware, a result set 440, 450 that include at least some of the first search results 540 and the second search results 440. At least one search result 440, 540 includes an application access mechanism 202 that has a reference to a corresponding installed application 204a on the user device 200 and indicates a performable operation for the corresponding installed application 204a. At block 1314, the method 1314 includes displaying, by the data processing hardware, the results set 440, 540 in the user interface 230 on the screen 201.

In some examples, the query information 340 includes at least one of: application programming interface selection data 342 including one or more query parses associated with the search query 332; application programming interface querying data 344 including one or more application programming interface requests 532 or instructions for generating the application programming interface 500; or search result display data 346. Each query parse includes a text string, a domain associates with the text string, or a probability value associated with the domain. In some examples, each application programming interface request 532 is associated with a version of the first search query 332 corrected for spelling, modified based on entity and/or location matches, and/or parameterized for an application programming interface 500. The data processing hardware may be local to the user device 200.

In some examples, the method 1300 further includes identifying, by the data processing hardware, the second search system 500 among a collection of search systems 500, 500a-n based on the query information 340 and/or the first search query 332. The method 1300 may include determining, by the data processing hardware, the second search query 532 for the second search system 500 based on the query information 340 and the first search query 332.

The method 1300 may further include displaying each search result 440, 540 of the results set 440, 540 in the user interface 230 as a user selectable link 250, where each search result 440, 450 has an associated application access mechanism 202 associated with the corresponding user selectable link 250. The method 1300 may further include receiving, at the data processing hardware, a user selection of one of the user selectable links 250, and executing the application access mechanism 202 associated with the selected user selectable link 250. The executed application access mechanism associated with the selected user selectable link 250 launches the corresponding installed application 204a on the user device 200 and sets the installed application 204a to an application state specified by the application access mechanism 202.

In some examples, the query information 340 includes search result display data 346. The method 1300 may include generating, by the data processing hardware, a result score 442, 542 for each of the first search results and/or each of the second search results using the search result display data. The method may further include ranking, by the data processing hardware, the first search results 540 and/or the second search results 440 based on the corresponding result scores 442, 552.

Figure 14:
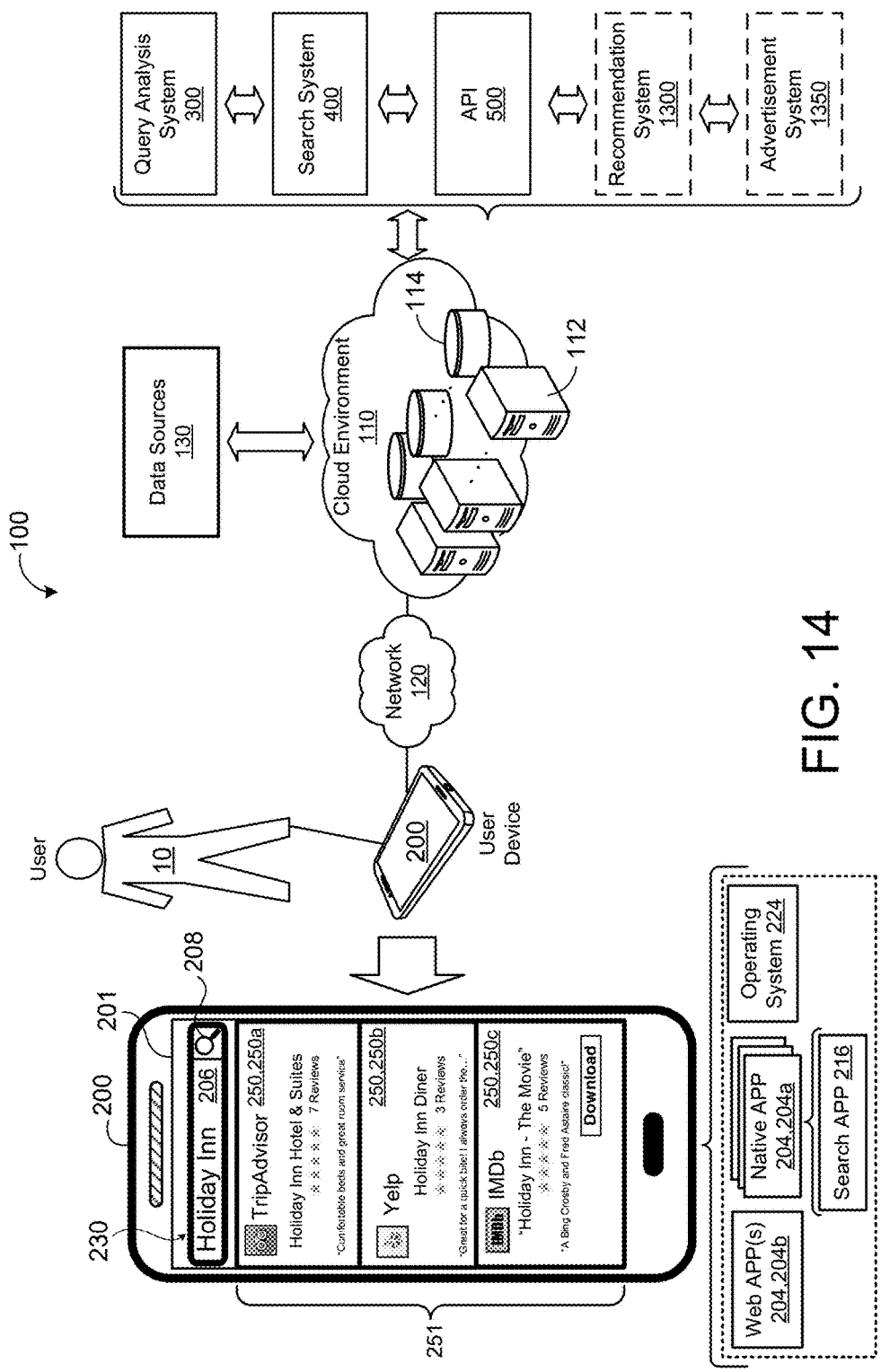
FIG. 14 is a schematic view of an example environment including a user device in communication with a query analysis system, a search system, API system, a recommendation system, and an advertisement system.

Referring to FIG. 14, in some implementations, the system 100 described above includes a recommendation system 1300 and/or an advertisement system 1350. In some examples, the recommendation system 1300 and/or advertisement system 1350 are in communication with the query analysis system 300 and/or the search system 400 and, while in other examples, the recommendation system 1300 and/or advertisement system 1350 are part of the analysis system 300 and/or the search system 400.

The recommendation system 1300 determines whether the search query 332 includes application intent that outputs an application intent recommendation and/or an application-state intent. The recommendation system 1300 sends a recommendation (i.e., the application intent recommendation and/or the application-state-intent recommendation 420) to the search system 400 or the APIs 500.

The recommendation system 1300 uses a number of criteria to determine when a search query 332 should be recommended for an application search resulting in API search results 540 or an application state search resulting in search system search results 440, where the combination of search results 440, 540 includes both application API search results 540 and search system search results 440 and, in some examples, advertisement results when available. In some implementations, the system 100 includes an advertisement system 1350 that may generate advertisements that are included in the search results 440, 450. The advertisement system 1350 may generate advertisements (not shown) for applications 204 (e.g., links to download applications) and/or links to application states. The advertisement system 1350 may generate advertisements in response to a variety of factors. The advertisement system 1350 may generate advertisements that include a variety of different types of advertising content. The content of the advertisement may refer to the images, text, videos, links, and other data (e.g., analytics data) included in the advertisement (e.g., content rendered by the user device 200). The advertisement system 1350 may select the content of an advertisement based on a variety of different factors including, but not limited to, the search query 332 (e.g., keywords), context (e.g., a GPS geolocation value of the user device), data associated with the parsed tokens, data associated with grammar matches (e.g., potential grammars/categories and/or confirmed grammars/categories), and other targeting parameters.

The advertisement system 1350 may include an advertisement data store (not illustrated) and an advertisement generation module (not shown). The advertisement data store may include advertisement content along with different parameters and triggers for generating advertisements. Advertisers (not shown) can interface with the advertisement system 1350 to generate/update advertisement content, parameters, and triggers. The advertisement generation module may generate advertisements based on the data included in the advertisement data store and based on data received from the recommendation system 1300 and/or the ad attributes module.

The one or more computing devices of the query analysis system 300 and/or the search system 400 may be configured to communicate with the network 120. The one or more computing devices of the search system 400 may also be configured to communicate with one another (e.g., via a computer network). In some examples, the one or more computing devices of the search system 400 includes one or more server computing devices configured to communicate with user devices 200 (e.g., receive query wrappers and transmit search results), gather data from data sources 130, index data, store the data, and store other documents. The one or more computing devices reside within a single machine at a single geographic location in some examples. In other examples, the one or more computing devices may reside within multiple machines at a single geographic location. In still other examples, the one or more computing devices of the query analysis system 300 and/or the search system 400 may be distributed across a number of geographic locations.

Figure 15:
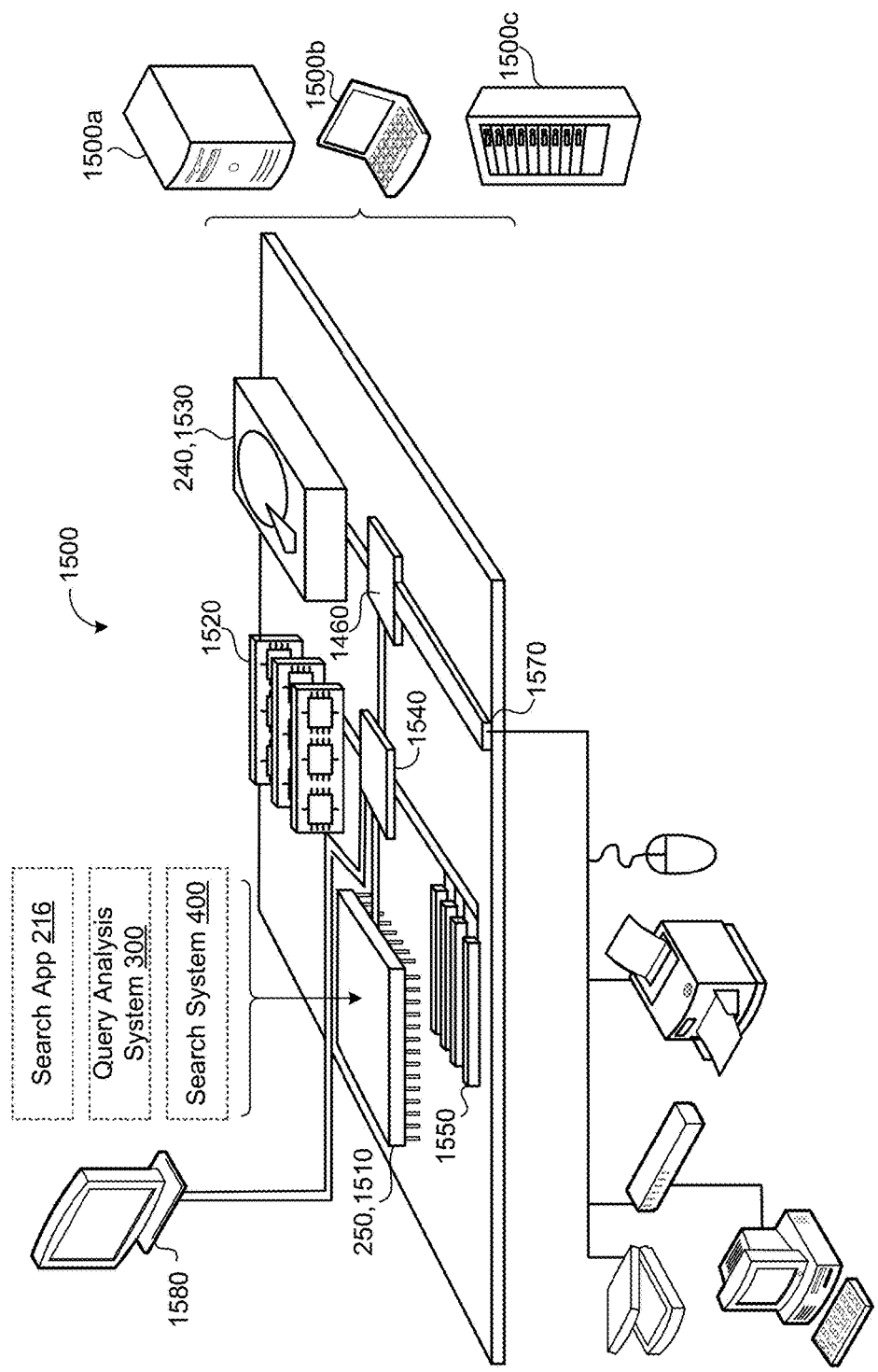
FIG. 15 is a schematic view of an example computing device executing any systems or methods described herein.

FIG. 15 is schematic view of an example computing device 1500 that may be used to implement the systems and methods described in this document. The computing device 1500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1500 includes a processor 1510, memory 1520, a storage device 1530, a high-speed interface/controller 1540 connecting to the memory 1520 and high-speed expansion ports 1550, and a low speed interface/controller 1560 connecting to low speed bus 1224 and storage device 1530. Each of the components 1510, 1520, 1530, 1540, 1550, and 1560, are interconnected using various busses, and may be mounted on a common motherboard or in other manners as appropriate. The processor 1510 can process instructions for execution within the computing device 1500, including instructions stored in the memory 1520 or on the storage device 1530 to display graphical information for a graphical user interface (GUI) on an external input/output device, such as display 1580 coupled to high speed interface 1540. In other implementations, multiple processors and/or multiple buses may be used, as appropriate, along with multiple memories and types of memory. Also, multiple computing devices 1500 may be connected, with each device providing portions of the necessary operations (e.g., as a server bank, a group of blade servers, or a multi-processor system).

The memory 1520 stores information non-transitorily within the computing device 1500. The memory 1520 may be a computer-readable medium, a volatile memory unit(s), or non-volatile memory unit(s). The non-transitory memory 1520 may be physical devices used to store programs (e.g., sequences of instructions) or data (e.g., program state information) on a temporary or permanent basis for use by the computing device 1500. Examples of non-volatile memory include, but are not limited to, flash memory and read-only memory (ROM/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1530 is capable of providing mass storage for the computing device 1500. In some implementations, the storage device 1530 is a computer-readable medium. In various different implementations, the storage device 1530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1520, the storage device 1530, or memory on processor 1510.

The high speed controller 1540 manages bandwidth-intensive operations for the computing device 1500, while the low speed controller 1560 manages lower bandwidth-intensive operations. Such allocation of duties is exemplary only. In some implementations, the high-speed controller 1540 is coupled to the memory 1520, the display 1580 (e.g., through a graphics processor or accelerator), and to the high-speed expansion ports 1550, which may accept various expansion cards (not shown). In some implementations, the low-speed controller 1560 is coupled to the storage device 1530 and low-speed expansion port 1224. The low-speed expansion port 1224, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 1500 may be implemented in a number of different forms, as shown in the figure. For example, it may be implemented as a standard server 1500*a* or multiple times in a group of such servers 1500*a*, as a laptop computer 1500*b*, or as part of a rack server system 1500*c*.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
    receiving, at data processing hardware, a first search query through a user device in communication with the data processing hardware in the user device;
    transmitting the first search query from the data processing hardware to a query analysis system and a first search system;
    receiving, at the data processing hardware, first search results from the first search system, the first search results being generated based on the first search query and query information generated in the query analysis system;
    receiving, at the data processing hardware, the query information from the query analysis system, the query information comprising application programming interface information for an application programming interface of a second search system;
    generating, at the data processing hardware, a second search query based on the query information;
    transmitting the second search query from the data processing hardware to the application programming interface of the second search system;
    receiving, at the data processing hardware, second search results from the second search system;
    determining, by the data processing hardware, a result set comprising at least some of the first search results and the second search results, at least one search result in the result set comprising an application access mechanism having a reference to a corresponding installed application on the user device and indicating a performable operation for the corresponding installed application; and
    displaying, by the data processing hardware, the result set in the user interface on screen.

2. The method of claim 1, further comprising identifying, by the data processing hardware, the second search system among a collection of search systems based on the query information and/or the first search query.

3. The method of claim 2, further comprising determining, by the data processing hardware, the second search query for the second search system based on the query information and the first search query.

4. The method of claim 1, further comprising displaying each search result of the results set in the user interface as a user selectable link, each search result having an associated application access mechanism associated with the corresponding user selectable link.

5. The method of claim 4, further comprising:
receiving, at the data processing hardware, a user selection of one of the user selectable links; and
executing, at the data processing hardware, the application access mechanism associated with the selected user selectable link.

6. The method of claim 5, wherein the executed application access mechanism associated with the selected user selectable link launches the corresponding installed application on the user device and sets the installed application to an application state specified by the application access mechanism.

7. The method of claim 1, wherein the query information comprises search result display data.

8. The method of claim 7, further comprising generating, by the data processing hardware, a result score for each of the first search results and/or each of the second search results using the search result display data.

9. The method of claim 8, further comprising ranking, by the data processing hardware, the first search results and/or the second search results based on the corresponding result scores.

10. The method of claim 9, further comprising displaying the search results of the result set in the user interface in an order based on the corresponding result scores.

11. A system comprising:
data processing hardware in a user device;
a screen of the user device in communication with the data processing hardware; and
memory hardware in communication with the data processing hardware, the memory hardware storing instructions that when executed on the data processing hardware cause the data processing hardware to perform operations comprising:
receiving a first search query at the data processing hardware;
transmitting the first search query from the data processing hardware to a query analysis system and a first search system;
receiving first search results from the first search system, the first search results being generated based on the first search query and query information generated in the query analysis system;
receiving the query information from the query analysis system, the query information comprising application programming interface information for an application programming interface of a second search system;
generating a second search query based on the query information;
transmitting the second search query from the data processing hardware to the application programming interface of the second search system;
receiving second search results from the second search system;
determining a result set comprising at least some of the first search results and the second search results, at least one search result in the result set comprising an application access mechanism having a reference to a corresponding installed application on the user device and indicating a performable operation for the corresponding installed application; and
displaying the result set in the user interface on the screen.

12. The system of claim 11, wherein the operations further comprise identifying the second search system among a collection of search systems based on the query information and/or the first search query.

13. The system of claim 12, wherein the operations further comprise determining the second search query for the second search system based on the query information and the first search query.

14. The system of claim 11, wherein the operations further comprise displaying each search result of the results set in the user interface as a user selectable link, each search result having an associated application access mechanism associated with the corresponding user selectable link.

15. The system of claim 14, wherein the operations further comprise:
receiving a user selection of one of the user selectable links; and
executing the application access mechanism associated with the selected user selectable link.

16. The system of claim 15, wherein the executed application access mechanism associated with the selected user selectable link launches the corresponding installed application on the user device and sets the installed application to an application state specified by the application access mechanism.

17. The system of claim 11, wherein the query information comprises search result display data.

18. The system of claim 17, wherein the operations further comprise generating a result score for each of the first search results and/or each of the second search results using the search result display data.

19. The system of claim 18, wherein the operations further comprise ranking the first search results and/or the second search results based on the corresponding result scores.

20. The system of claim 19, wherein the operations further comprise displaying the search results of the result set in the user interface in an order based on the corresponding result scores.

21. A method comprising:
receiving, at data processing hardware, a first search query from a user device in communication with the data processing hardware in the user device;
transmitting the first search query from the data processing hardware to a query analysis system and a first search system;
receiving, at the data processing hardware, first search results from the first search system, the first search results being generated based on the first search query and query information generated in the query analysis system;
receiving, at the data processing hardware, the query information based on the first search query from the query analysis system, the query information comprising application programming interface information for an application programming interface of a second search system;
generating, at the data processing hardware, a second search query based on the query information;
transmitting the second search query from the data processing hardware to the application programming interface of the second search system;
receiving, at the data processing hardware, second search results from the second search system;
sending a result set from the data processing hardware to the user device, the result set comprising at least some of the first search results and the second search results for display on the user device, at least one search result in the result set comprising an application access mechanism having a reference to a corresponding installed application on the user device and indicating a performable operation for the corresponding installed application.

22. The method of claim 21, further comprising identifying, by the data processing hardware, the second search system among a collection of search systems based on the query information and/or the first search query.

23. The method of claim 22, further comprising determining, by the data processing hardware, the second search query for the second search system based on the query information and the first search query.

24. The method of claim 21, wherein the application access mechanism is configured to launch the corresponding installed application on the user device and set the installed application to an application state specified by the application access mechanism.

25. The method of claim 21, wherein the query information comprises search result display data.

26. The method of claim 25, further comprising generating, by the data processing hardware, a result score for each of the first search results and/or each of the second search results using the search result display data.

27. The method of claim 26, further comprising ranking, by the data processing hardware, the first search results and/or each of the second search results based on the corresponding result scores.

28. A method comprising:
receiving, at data processing hardware in a user device, a first search query through a user interface displayed on a screen of the user device;
transmitting the first search query from the data processing hardware to a query analysis system and a first search system;
receiving, at the data processing hardware, query information from the query analysis system, the query information comprising application programming interface information for an application programming interface of a second search system;
generating, at the data processing hardware, a second search query based on the query information;
transmitting the second search query from the data processing hardware to the application program interface of the second search system;
receiving, at the data processing hardware, first search results from the first search system and second search results from the second search system, the first search results being generated based on the first search query and query information generated in the query analysis system;
determining, by the data processing hardware, a result set comprising at least some of the first search results and the second search results, at least one search result in the result set comprising an application access mechanism having a reference to a corresponding installed application on the user device and indicating a performable operation for the corresponding installed application; and
displaying, by the data processing hardware, the result set in the user interface on the screen.

29. The method of claim 28, wherein the query information comprises at least one of:

application programming interface selection data comprising one or more query parses associated with the first search query;
application programming interface querying data comprising one or more application programming interface requests or instructions for generating the application programming interface; or
search result display data.

30. The method of claim 29, wherein each query parse comprises a text string, a domain associates with the text string, or a probability value associated with the domain.

31. The method of claim 29, wherein each application programming interface request is associated with a version of the first search query corrected for spelling, modified based on entity and/or location matches, and/or parameterized for an application programming interface.

32. The method of claim 29, wherein the data processing hardware is local to the user device.

33. The method of claim 28, further comprising identifying, by the data processing hardware, the second search system among a collection of search systems based on the query information and/or the first search query.

34. The method of claim 33, further comprising determining, by the data processing hardware, the second search query for the second search system based on the query information and the first search query.

35. The method of claim 28, further comprising displaying each search result of the results set in the user interface as a user selectable link, each search result having an associated application access mechanism associated with the corresponding user selectable link.

36. The method of claim 35, further comprising:
receiving, at the data processing hardware, a user selection of one of the user selectable links; and
executing, at the data processing hardware, the application access mechanism associated with the selected user selectable link.

37. The method of claim 36, wherein the executed application access mechanism associated with the selected user selectable link launches the corresponding installed application on the user device and sets the installed application to an application state specified by the application access mechanism.

38. The method of claim 28, wherein the query information comprises search result display data.

39. The method of claim 38, further comprising generating, by the data processing hardware, a result score for each of the first search results and/or each of the second search results using the search result display data.

40. The method of claim 39, further comprising ranking, by the data processing hardware, the first search results and/or the second search results based on the corresponding result scores.

41. A method comprising:
receiving, at data processing hardware, a first search query through a user device in communication with the data processing hardware in the user device;
transmitting the first search query from the data processing hardware to a query analysis system and a first search system;
receiving, at the data processing hardware, first search results from the first search system the first search results being generated based on the first search query and query information generated in the query analysis system;
receiving, at the data processing hardware, the query information from the query analysis system, the query information comprising application programming interface information for an application programming interface of a second search system;

generating, at the data processing hardware, a second search query based on the query information;

transmitting the second search query from the data processing hardware to the application programming interface of the second search system;

receiving, at the data processing hardware, second search results from the second search system;

determining, by the data processing hardware, a result set comprising at least some of the first search results and the second search results, at least one search result in the result set comprising an application access mechanism or functionality of applications relevant to the first search query; and displaying, by the data processing hardware, the result set in the user interface on screen.

* * * * *